United States Patent
Zu et al.

(10) Patent No.: US 10,410,984 B1
(45) Date of Patent: *Sep. 10, 2019

(54) PACKAGE SUBSTRATE DIFFERENTIAL IMPEDANCE OPTIMIZATION FOR 25 TO 60 GBPS AND BEYOND

(71) Applicant: Sarcina Technology LLC, Palo Alto, CA (US)

(72) Inventors: Longqiang Zu, Palo Alto, CA (US); Li-Chang Hsiao, Miaoli County (TW)

(73) Assignee: Sarcina Technology LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,396

(22) Filed: May 20, 2018

Related U.S. Application Data

(63) Continuation of application No. 15/495,881, filed on Apr. 24, 2017, which is a continuation-in-part of
(Continued)

(51) Int. Cl.
*H01L 23/66* (2006.01)
*H04B 1/40* (2015.01)
(Continued)

(52) U.S. Cl.
CPC .......... *H01L 23/66* (2013.01); *G06F 17/5009* (2013.01); *H01L 23/49822* (2013.01); *H01L 23/49827* (2013.01); *H01L 23/49838* (2013.01); *H01L 24/16* (2013.01); *H04B 1/40* (2013.01); *G06F 2217/08* (2013.01); *G06F 2217/40* (2013.01); *H01L 2223/6616* (2013.01); *H01L 2223/6638* (2013.01); *H01L 2224/16227* (2013.01)

(58) Field of Classification Search
CPC combination set(s) only.
See application file for complete search history.

(56) References Cited

U.S. PATENT DOCUMENTS 7,271,681 B2   9/2007  Dyckman
7,531,751 B2   5/2009  Hosomi
(Continued)

*Primary Examiner* — Fernando L Toledo
*Assistant Examiner* — Valerie N Newton
(74) *Attorney, Agent, or Firm* — ROARK IP

(57) ABSTRACT

Package design method for semiconductor chip package for high speed SerDes signals for optimization of package differential impedance and reduction of package differential insertion loss and differential return loss at data rates of 25 to 60 Gb/s and beyond. The method optimizes parameters of vertical interconnections of BGA ball, via, and PTH, and around the joint between vertical and horizontal interconnections of traces. Also disclosed are examples of chip package designs for high speed SerDes signals, including one using 0.8 mm BGA ball pitch and IO-layer buildup substrate, one using 1 mm BGA ball pitch and 14-layer buildup substrate, one using 6-layer buildup substrate with signals routed on top and bottom metal layers with microstrip line structure, and one using 12-layer package substrate with unique via configuration, all of which achieve low substrate differential impedance discontinuity, reduced differential insertion loss and differential return loss between BGA balls and C4 bumps.

11 Claims, 48 Drawing Sheets

Related U.S. Application Data application No. 14/729,050, filed on Jun. 2, 2015, now Pat. No. 9,666,544.

(60) Provisional application No. 62/327,287, filed on Apr. 25, 2016.

(51) Int. Cl.
  *G06F 17/50* (2006.01)
  *H01L 23/00* (2006.01)
  *H01L 23/498* (2006.01)

(56) References Cited

U.S. PATENT DOCUMENTS

| | | |
|---|---|---|
| 7,781,889 B2 | 8/2010 | Leader |
| 8,119,931 B1 | 2/2012 | Liu |
| 2010/0232480 A1 | 9/2010 | Bhandal |
| 2014/0252612 A1 | 9/2014 | Nakagawa |
| 2017/0229407 A1* | 8/2017 | Zu .................... G06F 17/5036 |

* cited by examiner

Figure 3a

| Layer Stackup | Type | Material | Thickness (um) | Conductivity (S/m) | Dielectric Constant | Loss Tangent |
|---|---|---|---|---|---|---|
| SOLDER MASK-TOP | SURFACE | AIR | | | 1 | 0 |
| CU-1 | DIELECTRIC | PSR-4000 AUS703 | 25 | | 3.8 | 0.026 |
| DRILL1-2 | CONDUCTOR | COPPER | 15 | 59590000 | | |
| CU-2 | DIELECTRIC | ABF-GX13 | 30 | 0 | 3.35 | 0.012 |
| DRILL2-3 | CONDUCTOR | COPPER | 15 | 59590000 | | |
| CU-3 | DIELECTRIC | ABF-GX13 | 30 | 0 | 3.35 | 0.012 |
| DRILL3-4 | CONDUCTOR | COPPER | 15 | 59590000 | | |
| CU-4 | DIELECTRIC | ABF-GX13 | 30 | 0 | 3.35 | 0.012 |
| DRILL4-5 | CONDUCTOR | COPPER | 23 | 59590000 | | |
| CU-5 | DIELECTRIC | Hitachi MCLE700GR | 400 | 0 | 4.7 | 0.011 |
| DRILL5-6 | CONDUCTOR | COPPER | 23 | 59590000 | | |
| CU-6 | DIELECTRIC | ABF-GX13 | 30 | 0 | 3.35 | 0.012 |
| DRILL6-7 | CONDUCTOR | COPPER | 15 | 59590000 | | |
| CU-7 | DIELECTRIC | ABF-GX13 | 30 | 0 | 3.35 | 0.012 |
| DRILL7-8 | CONDUCTOR | COPPER | 15 | 59590000 | | |
| CU-8 | DIELECTRIC | ABF-GX13 | 30 | 0 | 3.35 | 0.012 |
| DRILL8-9 | CONDUCTOR | COPPER | 15 | 59590000 | | |
| CU-9 | DIELECTRIC | ABF-GX13 | 30 | 0 | 3.35 | 0.012 |
| DRILL9-10 | CONDUCTOR | COPPER | 15 | 59590000 | | |
| CU-10 | DIELECTRIC | PSR-4000 AUS703 | 25 | | 3.8 | 0.026 |
| SOLDER MASK-BOTTOM | SURFACE | AIR | | | 1 | 0 |

Figure 3b

| Layer Stackup | Type | Material | Thickness (um) | Conductivity (S/m) | Dielectric Constant | Loss Tangent |
|---|---|---|---|---|---|---|
|  | SURFACE | AIR |  |  | 1 | 0 |
| SOLDER MASK-TOP | DIELECTRIC | PSR-4000 AUS703 | 25 |  | 3.8 | 0.026 |
| CU-1 | CONDUCTOR | COPPER | 15 | 59590000 |  |  |
| DRILL1-2 | DIELECTRIC | ABF-GX13 | 33 |  | 3.32 | 0.0175 |
| CU-2 | CONDUCTOR | COPPER | 15 | 59590000 |  |  |
| DRILL2-3 | DIELECTRIC | ABF-GX13 | 33 |  | 3.32 | 0.0175 |
| CU-3 | CONDUCTOR | COPPER | 15 | 59590000 |  |  |
| DRILL3-4 | DIELECTRIC | ABF-GX13 | 33 |  | 3.32 | 0.0175 |
| CU-4 | CONDUCTOR | COPPER | 15 | 59590000 |  |  |
| DRILL4-5 | DIELECTRIC | ABF-GX13 | 33 |  | 3.32 | 0.0175 |
| CU-5 | CONDUCTOR | COPPER | 15 | 59590000 |  |  |
| DRILL5-6 | DIELECTRIC | ABF-GX13 | 33 |  | 3.32 | 0.0175 |
| CU-6 | CONDUCTOR | COPPER | 15 | 59590000 |  |  |
| DRILL6-7 | DIELECTRIC | ABF-GX13 | 33 |  | 3.32 | 0.0175 |
| CU-7 | CONDUCTOR | COPPER | 23 | 59590000 |  |  |
| DRILL7-8 | DIELECTRIC | Hitachi MCLE700GR | 800 |  | 4.6 | 0.01 |
| CU-8 | CONDUCTOR | COPPER | 23 | 59590000 |  |  |
| DRILL8-9 | DIELECTRIC | ABF-GX13 | 33 |  | 3.32 | 0.0175 |
| CU-9 | CONDUCTOR | COPPER | 15 | 59590000 |  |  |
| DRILL9-10 | DIELECTRIC | ABF-GX13 | 33 |  | 3.32 | 0.0175 |
| CU-10 | CONDUCTOR | COPPER | 15 | 59590000 |  |  |
| DRILL10-11 | DIELECTRIC | ABF-GX13 | 33 |  | 3.32 | 0.0175 |
| CU-11 | CONDUCTOR | COPPER | 15 | 59590000 |  |  |
| DRILL11-12 | DIELECTRIC | ABF-GX13 | 33 |  | 3.32 | 0.0175 |
| CU-12 | CONDUCTOR | COPPER | 15 | 59590000 |  |  |
| DRILL12-13 | DIELECTRIC | ABF-GX13 | 33 |  | 3.32 | 0.0175 |
| CU-13 | CONDUCTOR | COPPER | 15 | 59590000 |  |  |
| DRILL13-14 | DIELECTRIC | ABF-GX13 | 33 |  | 3.32 | 0.0175 |
| CU-14 | CONDUCTOR | COPPER | 15 | 59590000 |  |  |
| SOLDER MASK-BOTTOM | DIELECTRIC | PSR-4000 AUS703 | 25 |  | 3.8 | 0.026 |
|  | SURFACE | AIR |  |  | 1 | 0 |

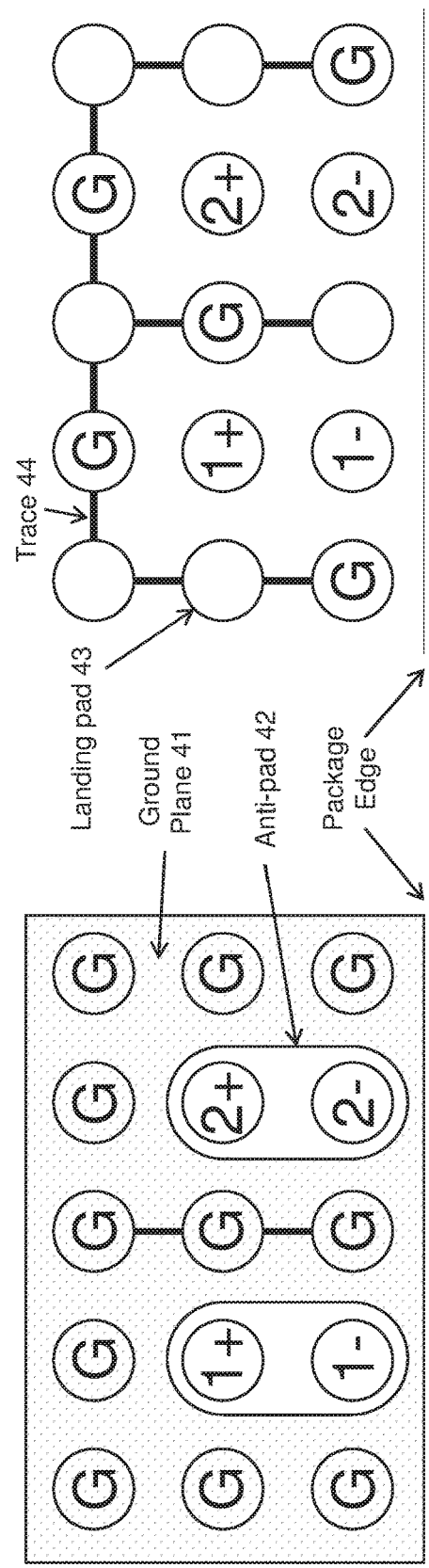

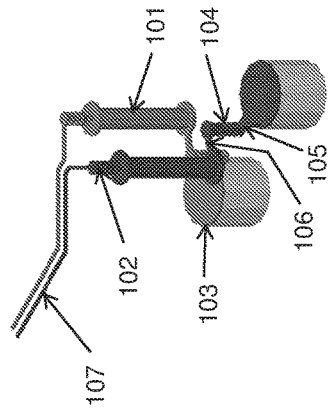
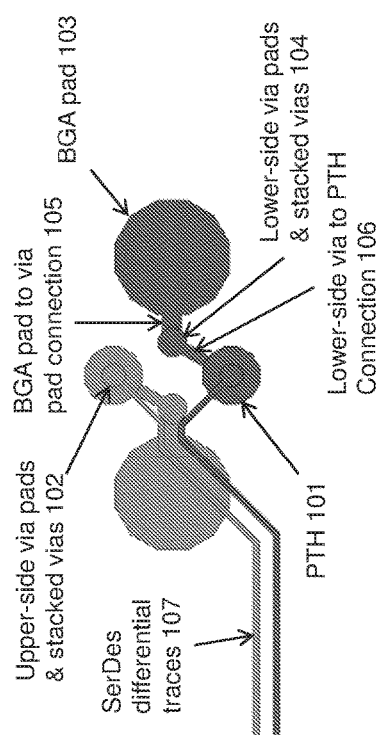
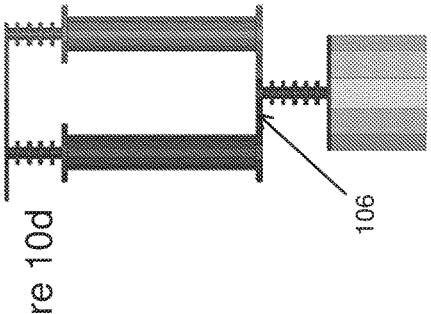
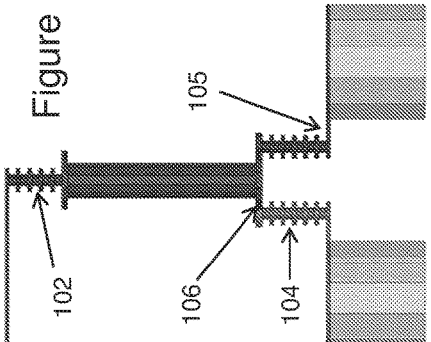

Figure 11

| Parameters | 1 | 2 |
|---|---|---|
| BGA ball pitch (mm) | 0.8 | 1.0 |
| BGA ball height after reflow (mm) | 0.35 | 0.4 |
| BGA ball diameter after reflow (mm) | 0.4 | 0.5 |
| BGA ball pad diameter (mm) | 0.5 | 0.5 |
| Via diameter (um) | 60 | 60 |
| Via pad diameter (um) | 100 | 100 |
| Via pitch below PTH (um) | 550 | 280 |
| PTH diameter (um) | 150 | 150 |
| PTH pad diameter (um) | 300 | 300 |
| PTH pitch (um) | 550 | 500 |
| Via pitch above PTH (um) | 550 | 500 |
| Bump height after reflow (um) | 85 | 85 |
| Bump width after reflow (um) | 85 | 85 |

Figure 13
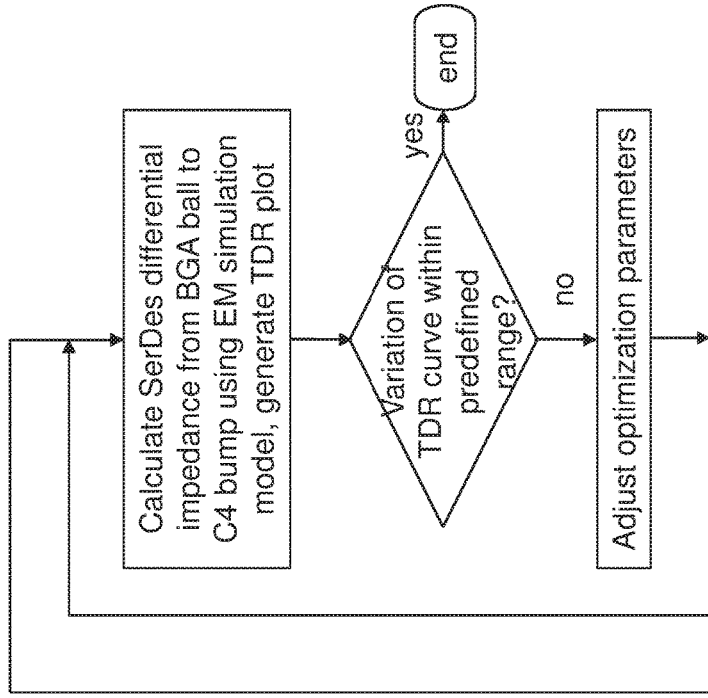
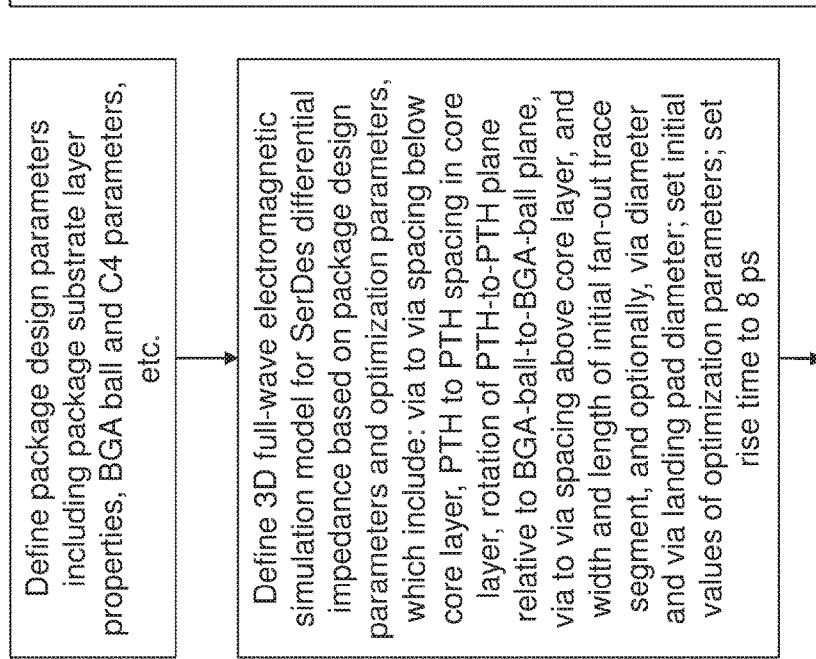

Figure 16

| Layer Stackup | Type | Material | Thickness (um) | Conductivity (S/m) | Dielectric Constant | Loss Tangent |
|---|---|---|---|---|---|---|
| | SURFACE | AIR | | | 1 | 0 |
| SOLDER MASK-TOP | DIELECTRIC | PSR-4000 AUS703 | 25 | | 3.8 | 0.026 |
| CU-1 | CONDUCTOR | COPPER | 15 | 57000000 | | |
| DRILL1-2 | DIELECTRIC | ABF series | 33 | 0 | 3.35 | 0.019 |
| CU-2 | CONDUCTOR | COPPER | 15 | 57000000 | | |
| DRILL2-3 | DIELECTRIC | ABF series | 33 | 0 | 3.35 | 0.019 |
| CU-3 | CONDUCTOR | COPPER | 20 | 57000000 | | |
| DRILL3-4 | DIELECTRIC | Core | 400 | 0 | 4.6 | 0.012 |
| CU-4 | CONDUCTOR | COPPER | 20 | 57000000 | | |
| DRILL4-5 | DIELECTRIC | ABF series | 33 | 0 | 3.35 | 0.019 |
| CU-5 | CONDUCTOR | COPPER | 15 | 57000000 | | |
| DRILL5-6 | DIELECTRIC | ABF series | 33 | 0 | 3.35 | 0.019 |
| CU-6 | CONDUCTOR | COPPER | 15 | 57000000 | | |
| SOLDER MASK-BOTTOM | DIELECTRIC | PSR-4000 AUS703 | 25 | | 3.8 | 0.026 |
| | SURFACE | AIR | | | 1 | 0 |

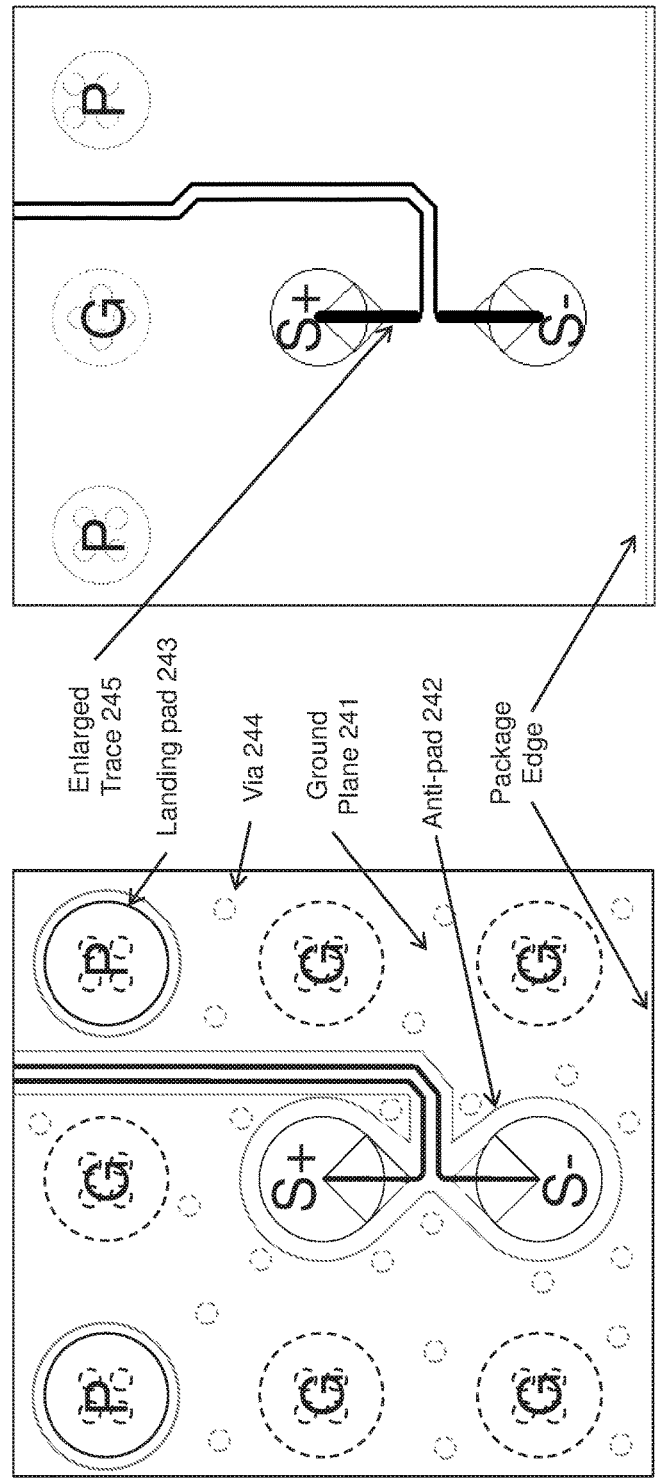

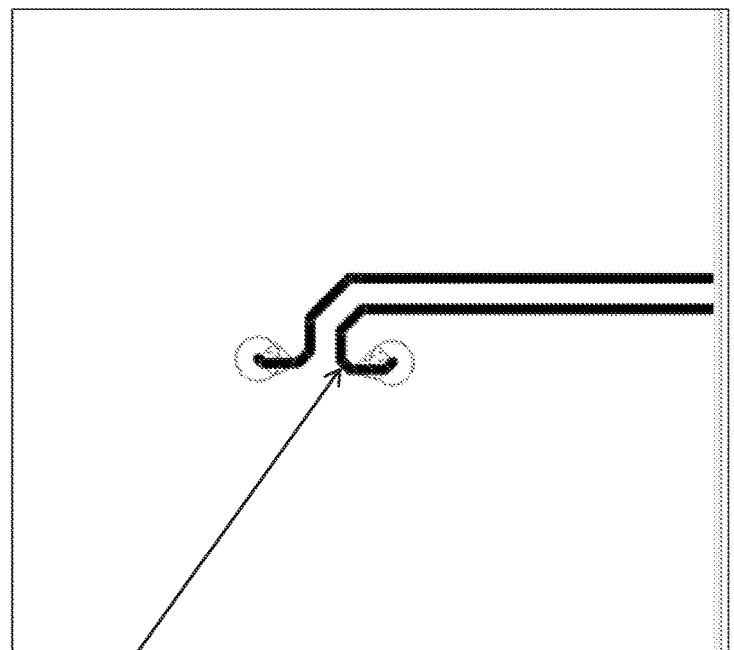
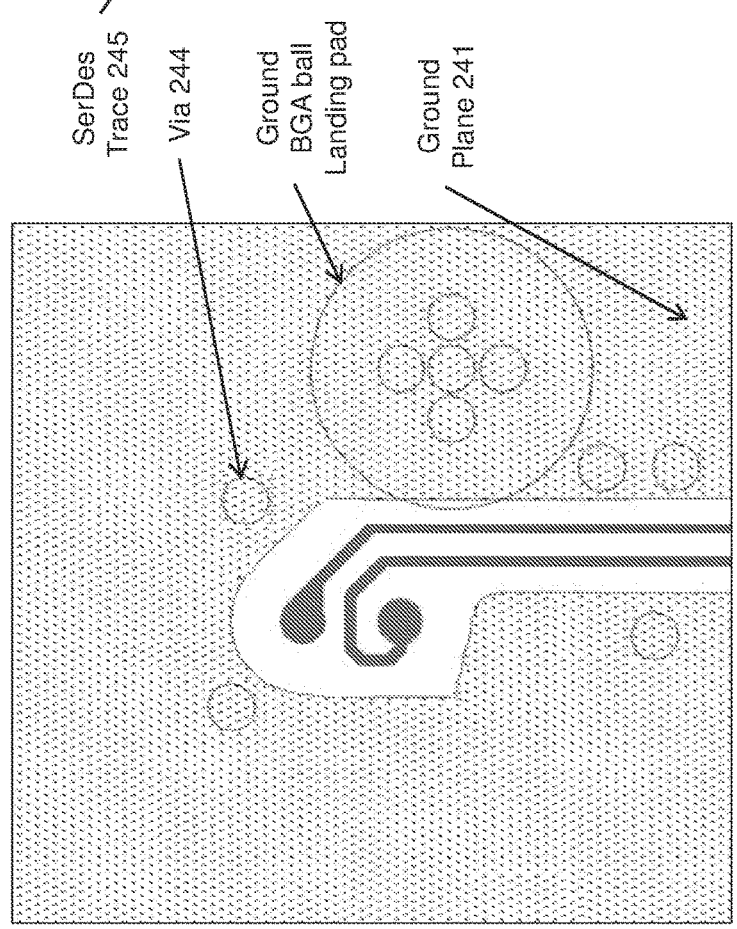

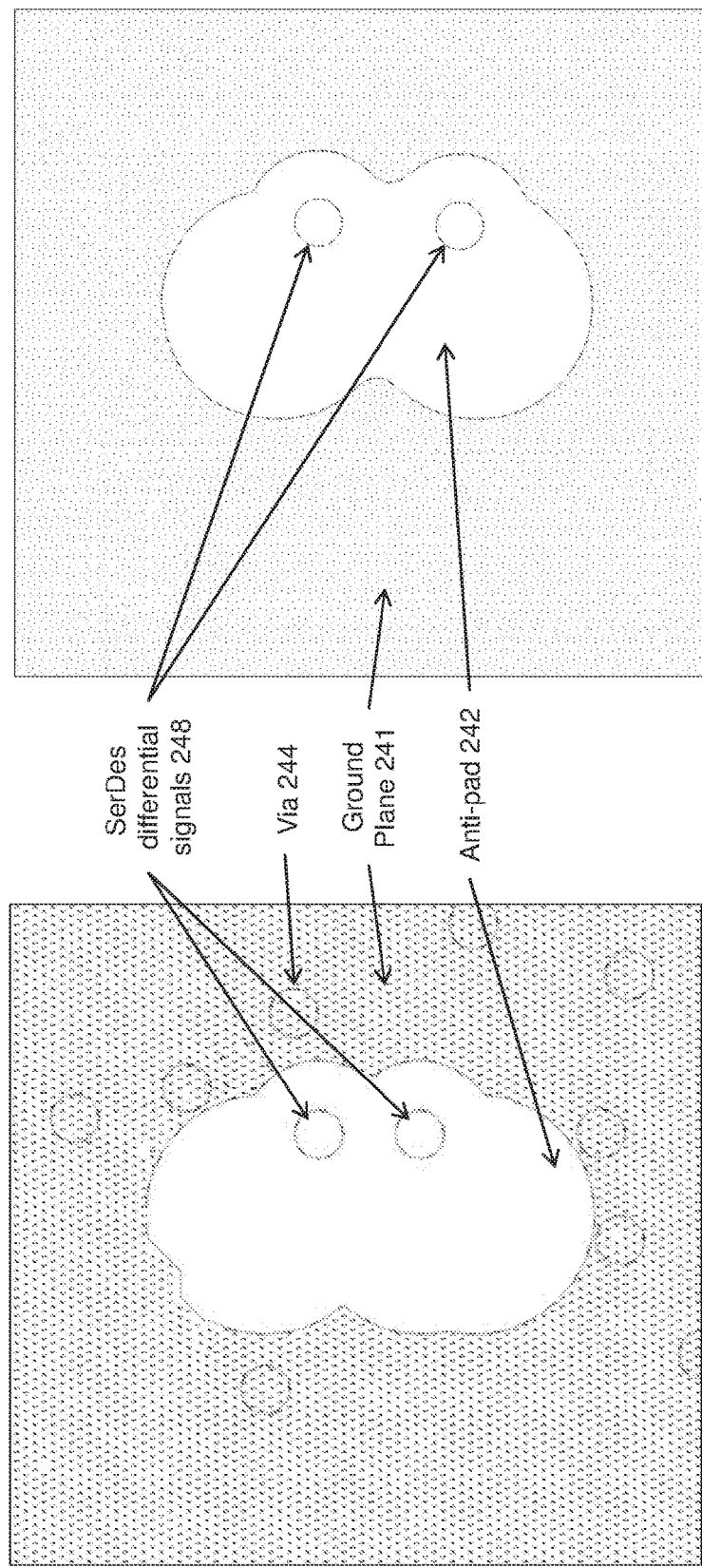

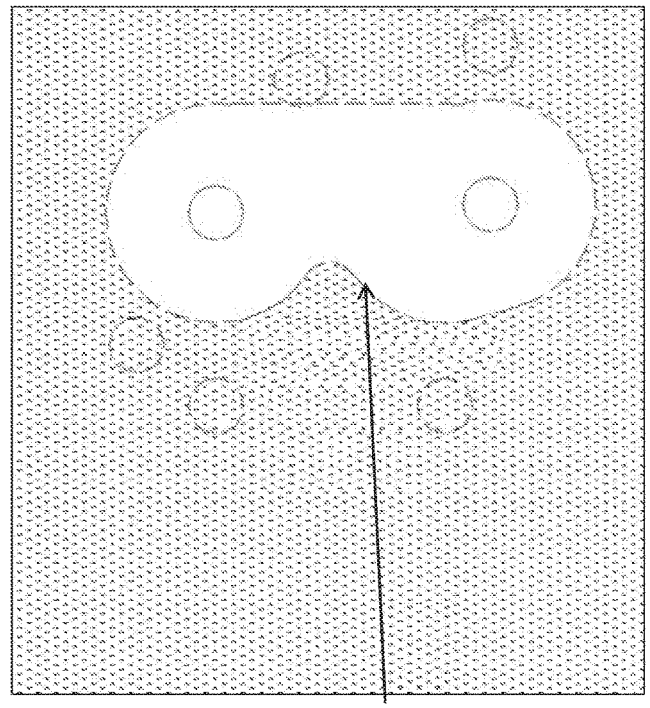
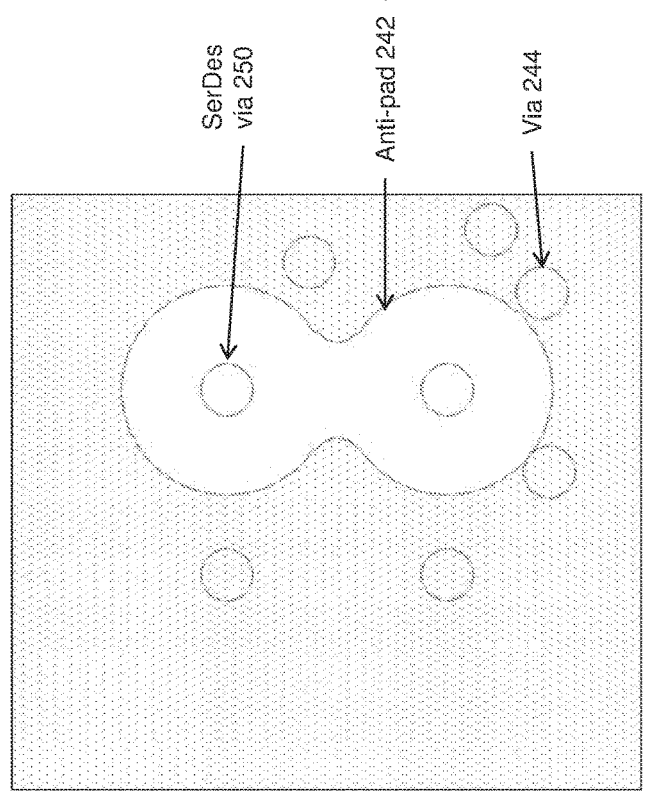
Figure 24a (prior art)
Figure 24b

Figure 31

| Parameters | |
|---|---|
| BGA ball pitch (mm) | 1 |
| BGA ball height after reflow (mm) | 1 |
| BGA ball diameter after reflow (mm) | 0.35 |
| BGA ball pad diameter (mm) | 0.400 |
| Via diameter (um) | 0.5 |
| Via pad diameter (um) | 60 |
| Via pitch below PTH (um) | 100 |
| PTH diameter (um) | 294.5 |
| PTH pad diameter (um) | 150 |
| PTH pitch (um) | 250 |
| Via pitch above PTH (um) | 500 |
| Bump height after reflow (um) | 500 |
| Bump width after reflow (um) | 85 |
| | 85 |

Figure 32

| Name | Type | Thickness (um) | Material | Conductivity (S/m) | Dielectric Fill | Dielectric constant | Loss tangent |
|---|---|---|---|---|---|---|---|
| Solder Mask | Dielectric | 21 | AUS703 | 0 | | 3.8 | 0.026 |
| Cu-1 | Metal | 15 | Cu | 5.80E+07 | AUS703 | 3.8 | 0.026 |
| Dielectric-1 | Dielectric | 33 | GZ41 | 0 | | 3.2 | 0.0058 |
| Cu-2 | Metal | 15 | Cu | 5.80E+07 | GZ41 | 3.2 | 0.0058 |
| Dielectric-2 | Dielectric | 33 | GZ41 | 0 | | 3.2 | 0.0058 |
| Cu-3 | Metal | 15 | Cu | 5.80E+07 | GZ41 | 3.2 | 0.0058 |
| Dielectric-3 | Dielectric | 33 | GZ41 | 0 | | 3.2 | 0.0058 |
| Cu-4 | Metal | 15 | Cu | 5.80E+07 | GZ41 | 3.2 | 0.0058 |
| Dielectric-4 | Dielectric | 33 | GZ41 | 0 | | 3.2 | 0.0058 |
| Cu-5 | Metal | 15 | Cu | 5.80E+07 | GZ41 | 3.2 | 0.0058 |
| Dielectric-5 | Dielectric | 33 | GZ41 | 0 | | 3.2 | 0.0058 |
| Cu-6 | Metal | 23 | Cu | 5.80E+07 | GZ41 | 4.4 | 0.0058 |
| Dielectric-6 | Dielectric | 800 | E705G | 0 | | 3.2 | 0.008 |
| Cu-7 | Metal | 23 | Cu | 5.80E+07 | GZ41 | 3.2 | 0.0058 |
| Dielectric-7 | Dielectric | 33 | GZ41 | 0 | | 3.2 | 0.0058 |
| Cu-8 | Metal | 15 | Cu | 5.80E+07 | GZ41 | 3.2 | 0.0058 |
| Dielectric-8 | Dielectric | 33 | GZ41 | 0 | | 3.2 | 0.0058 |
| Cu-9 | Metal | 15 | Cu | 5.80E+07 | GZ41 | 3.2 | 0.0058 |
| Dielectric-9 | Dielectric | 33 | GZ41 | 0 | | 3.2 | 0.0058 |
| Cu-10 | Metal | 15 | Cu | 5.80E+07 | GZ41 | 3.2 | 0.0058 |
| Dielectric-10 | Dielectric | 33 | GZ41 | 0 | | 3.2 | 0.0058 |
| Cu-11 | Metal | 15 | Cu | 5.80E+07 | GZ41 | 3.2 | 0.0058 |
| Dielectric-11 | Dielectric | 33 | GZ41 | 0 | | 3.2 | 0.0058 |
| Cu-12 | Metal | 15 | Cu | 5.80E+07 | AUS703 | 3.8 | 0.026 |
| Solder Mask | Dielectric | 21 | AUS703 | 0 | | 3.8 | 0.026 |

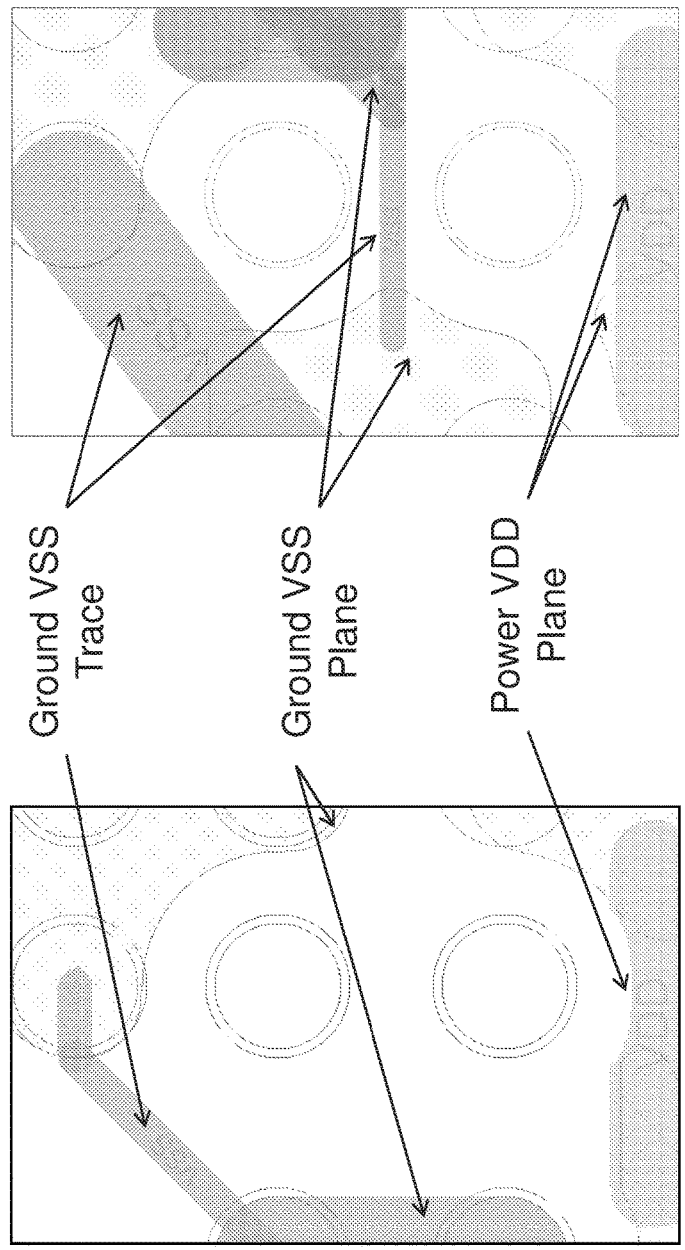

PACKAGE SUBSTRATE DIFFERENTIAL IMPEDANCE OPTIMIZATION FOR 25 TO 60 GBPS AND BEYOND

PRIORITY CLAIM

This application is a continuation of U.S. patent application Ser. No. 15/495,881, filed on Apr. 24, 2017; which is a continuation-in-part of U.S. patent application Ser. No. 14/729,050, filed on Jun. 2, 2015 (now U.S. Pat. No. 9,666,544); and a non-provisional filing of U.S. Patent Provisional Application Ser. No. 62/327,287, filed on Apr. 25, 2016; the aforementioned applications all being incorporated herein by reference in their entirety.

BACKGROUND OF THE INVENTION

Field of the Invention

This invention relates to semiconductor chip package design for high speed SerDes signals which achieves low insertion loss, low return loss, and low substrate differential impedance discontinuity between BGA balls and C4 bumps. It also provides an optimization method for calculating parameters of such a package.

Description of the Related Art and Background

To meet the ever increased challenge for high speed chip-to-chip communication, today's semiconductor chips often use high speed SerDes (Serializer/Deserializer) interconnection technology. The cutting edge SerDes data rate has increased from 10 Gb/s to 25-28 Gb/s. SerDes differential impedance discontinuity of a flip-chip package is a key gauge in determining SerDes eye diagram quality. A high package impedance discontinuity from ball grid array (BGA) ball to C4 bump will lead to large signal reflections, increased differential return loss, and degraded signal quality and as a result, reduced eye height and eye width. Unfortunately, in a semiconductor package the impedance mismatch is considered natural because of different substrate structures: BGA ball, via, PTH (plated-through-hole), trace, and C4 bump. They are required to deliver electrical interconnection in a robust mechanical enclosure. Usually each substrate structure has different electrical characteristic impedance. Having them connected together naturally brings impedance mismatch. If the differential impedance mismatch of a SerDes signal could be lowered, the receiver eye diagram could be opened up wider especially along the voltage axis. A widely opened eye diagram permits a longer cable to be used in data transmission which is essential in datacenter applications from one machine on a rack to a far-away machine on the same rack or to another machine on a different rack. It will also allow two SerDes chips to be placed further apart. If the transmission channel length is not increased, a good eye diagram helps to reduce the bit error rate in data transmission.

The dramatic increase in substrate impedance discontinuity at 25 Gb/s and beyond has made it hard to meet minimum differential return loss specifications from various organizations and has become a major issue in SerDes signal transmission. At 10 Gb/s data rate, the rise time is about 20 ps. It is easy to make the package substrate differential impedance to be within ±10% of its desired value. One widely used approach is to increase the antipad diameter for BGA ball pad, via pad, and PTH pad. An antipad is the clear area around a feature or a landing pad where the metal plane, mostly ground, is removed. Nevertheless, at 25 Gb/s data rate and beyond, these simple approaches are no longer effective in achieving the desired values of less than +10% differential impedance variation from BGA ball to C4 bump.

FIG. 1 is a substrate cross section for a flip-chip BGA package. SerDes signals from silicon die bumps (C4 bumps) 11 are transmitted to BGA balls 20 through differential traces 13, front-side vias 14, PTHs 16, and back-side vias 18. For a good package design that meets the differential impedance discontinuity requirement of less than ±10% at 10 Gb/s data rate, the impedance variation for the same package design could be close to ±35% when the data rate is increased to 25 Gb/s. Here the fast edge rate of signal switching caused by reduced rise time enlarged signal impedance discontinuity in a package.

FIG. 14 is a substrate cross section for another flip-chip BGA package, which is similar to that shown in FIG. 1 but uses microstrip lines routed on top and bottom metal layers.

Package horizontal interconnection for a SerDes differential signal is realized by routing two traces in parallel in a metal layer. It is widely known that by properly selecting the trace width and spacing of the two traces, it is easy to get desired differential trace impedance of about 100 Ohms. Notwithstanding, for a vertical interconnection, maintaining a 100-Ohm differential impedance from BGA ball to C4 bump (including vias and PTHs) is challenging because the diameters, heights and spacing of these structures are vastly different from each other. This makes their differential impedance different too.

FIG. 2 is a TDR (Time Domain Reflectometry) plot showing a SerDes signal differential impedance discontinuity inside a package and enlargement due to reduced rise time. Different package structures, BGA ball, via, PTH, trace and C4 bump, have different impedances. The TDR plot shows the substrate impedance discontinuity from BGA ball to via/PTH and then from trace to C4 bump. At 10 Gb/s data rate (dash-dotted line), the rise time is about 20 ps and the differential impedance mismatch can be controlled within 10%. However, for the same design at 25 Gb/s data rate (solid line), the rise time is about 8 ps and the differential impedance mismatch could be close to 30% and range from 70 Ohms to 130 Ohms. In other words, the impedance mismatch increases with the increase of data rate.

FIG. 15 are two TDR (Time Domain Reflectometry) plots showing a similar phenomenon.

Because of the high impedance discontinuity and the large signal reflection as well as the big differences in structure, vertical differential impedance optimization to lower its variation becomes challenging. Furthermore, each vertical interconnection, BGA ball, via, and PTH has a slightly bigger landing pad (landing pads are shown in FIG. 1 as bump landing pad 12, via landing pad 15, PTH landing pad 17, and ball landing pad 19). It is the requirement of substrate fabrication to consider the tolerance of the machine alignment with respect to a particular position. These tolerances avoid the opening of an interconnection. However, the various landing pads from layer to layer make the impedance even worse and more difficult to manage. In addition, there are horizontal metal planes from each layer surrounding the vertical interconnections. Their impact on the differential impedance of a vertical interconnection cannot be neglected. Finally, the transition from vertical interconnection to horizontal interconnection imposes a challenge to package designer because matching the impedance at the transition point is difficult.

SUMMARY OF THE INVENTION

To overcome some or all of the above-discussed problems, special designs in BGA ball assignment, via and PTH placement, metal void and shielding balance, and trace width adjustment near the transition location may be provided. In the meantime, the design can meet high volume manufacturing design rules and can pass rigorous quality and reliability tests.

Another embodiment of the present disclosure may be used for semiconductor chip package design for high speed SerDes signals which provides low substrate differential impedance discontinuity from BGA balls to C4 bumps where high speed signals are routed on top and bottom metal layers with microstrip line structure.

In one aspect of the present disclosure, a semiconductor chip package for high speed SerDes signals is provided, which includes: a plurality of dielectric layers and a plurality of conductive layers interleaved with each other forming a stack of layers, including a core dielectric layer, a first plurality of dielectric layers and a first plurality of conductive layers above the core layer, and a second plurality of dielectric layers and a second plurality of conductive layers below the core layer, wherein each of a first subset of consecutive dielectric layers of the first plurality of dielectric layers has at least first and second front-side vias, the first front-side vias of the first subset of dielectric layers being stacked and centered with each other to form a first front-side via stack, and the second front-side vias of the first subset of dielectric layers being stacked and centered with each other to form a second front-side via stack, wherein the first and second front-side via stacks are adjacent each other and separated by a first predetermined distance, wherein the core layer has at least first and second plated-through-holes (PTHs) adjacent each other and separated by a second predetermined distance, wherein each of a second subset of consecutive dielectric layers of the second plurality of dielectric layers has at least first and second back-side vias, the first back-side vias of the second subset of dielectric layers being stacked and centered with each other to form a first back-side via stack, and the second back-side vias of the second subset of dielectric layers being stacked and centered with each other to form a second back-side via stack, wherein the first and second back-side via stacks are adjacent each other and separated by a third predetermined distance, wherein either a conductive layer immediately above a top one of the first subset of dielectric layers or a conductive layer immediately below a bottom one of the first subset of dielectric layers is a routing layer, wherein the routing layer has at least first and second metal traces respectively connected to the first and second via stacks, the first and second metal traces each including a designated segment having a predetermined length and a predetermined width which are different from a width of remaining portions of the first and second metal traces, and wherein each of at least some of the first plurality of conductive layers have a metal ground plane with an antipad or ground void around first and second via landing pads corresponding to the first and second via stacks, and wherein each of the second subset of conductive layers is free of a metal ground plane; at least a first and a second silicon die bumps (C4 bumps) formed on a top one of the first plurality of conductive layers for flip-chip mounting a semiconductor chip, wherein each C4 bump is electrically connected to a via in a top one of the first plurality of dielectric layers; a plurality of ball grid array (BGA) ball landing pads formed on a bottom side of a bottom one of the second plurality of conductive layers, the BGA ball landing pads forming a grid; and at least a first and a second BGA balls formed on two of the BGA ball landing pads which are electrically connected to the first and second back-side via stacks, wherein the first BGA ball is electrically connected to the first C4 bump through at least the first back-side via stack, the first PTH, the first front-side via stack, and the first metal trace, and wherein the second BGA ball is electrically connected to the second C4 bump through at least the second back-side via stack, the second PTH, the second front-side via stack, and the second metal trace, and wherein a SerDes signal differential impedance from the first and second BGA balls to the corresponding first and second C4 bumps has a variation of less than 10% in a time domain for a signal with a 25 Gb/s or higher data rate.

In another aspect of the present disclosure, there is provided an optimization method for a semiconductor chip package for high speed SerDes signals, the package including: a plurality of dielectric layers and a plurality of conductive layers interleaved with each other forming a stack of layers, including a core dielectric layer, a first plurality of dielectric layers and a first plurality of conductive layers above the core layer, and a second plurality of dielectric layers and a second plurality of conductive layers below the core layer, wherein each of a first subset of consecutive dielectric layers of the first plurality of dielectric layers has at least first and second front-side vias, the first front-side vias of the first subset of dielectric layers being stacked and centered with each other to form a first front-side via stack, and the second front-side vias of the first subset of dielectric layers being stacked and centered with each other to form a second front-side via stack, wherein the first and second front-side via stacks are adjacent each other and separated by a first distance, wherein the core layer has at least first and second plated-through-holes (PTHs) adjacent each other and separated by a second distance, wherein each of a second subset of consecutive dielectric layers of the second plurality of dielectric layers has at least first and second back-side vias, the first back-side vias of the second subset of dielectric layers being stacked and centered with each other to form a first back-side via stack, and the second back-side vias of the second subset of dielectric layers being stacked and centered with each other to form a second back-side via stack, wherein the first and second back-side via stacks are adjacent each other and separated by a third distance, wherein either a conductive layer immediately above a top one of the first subset of dielectric layers or a conductive layer immediately below a bottom one of the first subset of dielectric layers is a routing layer, wherein the routing layer has at least first and second metal traces respectively connected to the first and second via stacks, the first and second metal traces each including a designated segment having a length and a width which are different from a width of remaining portions of the first and second metal traces, wherein each of at least some of the first plurality of conductive layers have a metal ground plane with an antipad or ground void around first and second via landing pads corresponding to the first and second via stacks; at least a first and a second silicon die bumps (C4 bumps) formed on a top one of the first plurality of conductive layers for flip-chip mounting a semiconductor chip, wherein each C4 bump is electrically connected to a via in a top one of the first plurality of dielectric layers; a plurality of ball grid array (BGA) ball landing pads formed on a bottom side of a bottom one of the second plurality of conductive layers, the BGA ball landing pads forming a grid; and at least a first and a second BGA balls formed on two of the BGA ball landing pads which are electrically connected to the first and second back-side via stacks, wherein the first BGA ball is electrically connected to the first C4 bump through at least the first back-side via stack, the first PTH, the first front-side via stack, and the first metal trace, and wherein the second BGA ball is electrically connected to the second C4 bump through at least the second back-side via stack, the second PTH, the second front-side via stack, and the second metal trace, wherein the optimization method includes: defining package design parameters including package layer count, thickness of each dielectric layer and conductive layer, BGA ball height and diameter after reflow, BGA ball landing pad spacing, assignment and pattern of BGA ball on BGA ball landing pads, C4 bump height and diameter after reflow, C4 bump spacing, and assignment and pattern of C4 bumps; defining a 3D full-wave electromagnetic simulation model for SerDes differential impedance from the first and second BGA balls to the respective first and second C4 bumps based on the package design parameters and a plurality of optimization parameters, the plurality of optimization parameters including: the first distance between the first and second front-side via stacks, the second distance between the first and second PTHs, the third distance between the first and second back-side via stacks, the lengths and widths of the designated segments of the first and second metal traces, and sizes of the antipads or ground voids in the metal ground planes of the at least some of the first plurality of conductive layers; setting initial values for the plurality of optimization parameters; calculating the SerDes differential impedance in a time domain using the simulation model, the package design parameters and the plurality of optimization parameters with their initial values; and if the calculated SerDes differential impedance in the time domain has a variation greater than a predetermined percentage, adjusting the optimization parameters, and re-calculating the SerDes differential impedance using the simulation model, the package design parameters and the plurality of optimization parameters with their adjusted values.

In another aspect of the present disclosure, a semiconductor chip package is provided for high speed SerDes signals, which includes: a plurality of dielectric layers and a plurality of conductive layers interleaved with each other forming a stack of layers, including a core dielectric layer, a first plurality of dielectric layers and a first plurality of conductive layers above the core layer, and a second plurality of dielectric layers and a second plurality of conductive layers below the core layer, wherein each of a first subset of consecutive dielectric layers of the first plurality of dielectric layers has at least first and second front-side vias, the first front-side vias of the first subset of dielectric layers being stacked and centered with each other to form a first front-side via stack, and the second front-side vias of the first subset of dielectric layers being stacked and centered with each other to form a second front-side via stack, wherein the first and second front-side via stacks are adjacent each other and separated by a first predetermined distance, wherein the core layer has at least first and second plated-through-holes (PTHs) adjacent each other and separated by a second predetermined distance, wherein a first one of the second plurality of dielectric layers immediately below the core dielectric layer has first and second back-side vias located directly below the first and second PTHs, wherein each of remaining ones of the second plurality of dielectric layers has first and second back-side vias which are respectively stacked and centered with each other to form first and second back-side via stacks, wherein the first and second back-side via stacks are adjacent each other and separated by a third predetermined distance which is smaller than the second predetermined distance, wherein either a conductive layer immediately above a top one of the first subset of dielectric layers or a conductive layer immediately below a bottom one of the first subset of dielectric layers is a routing layer, wherein the routing layer has at least first and second metal traces respectively connected to the first and second via stacks, the first and second metal traces each including a designated segment having a predetermined length and a predetermined width which are different from a width of remaining portions of the first and second metal traces, wherein each of at least some of the first plurality of conductive layers have a metal ground plane with an antipad or ground void around first and second via landing pads corresponding to the first and second via stacks, and wherein each of the second subset of conductive layers is free of a metal ground plane; at least a first and a second silicon die bumps (C4 bumps) formed on a top one of the first plurality of conductive layers for flip-chip mounting a semiconductor chip, wherein each C4 bump is electrically connected to a via in a top one of the first plurality of dielectric layers; a plurality of ball grid array (BGA) ball landing pads formed on a bottom side of a bottom one of the second plurality of conductive layers, the BGA ball landing pads forming a grid; and at least a first and a second BGA balls formed on two of the BGA ball landing pads which are electrically connected to the first and second back-side via stacks, wherein the first BGA ball is electrically connected to the first C4 bump through at least the first back-side via stack, the first PTH, the first front-side via stack, and the first metal trace, and wherein the second BGA ball is electrically connected to the second C4 bump through at least the second back-side via stack, the second PTH, the second front-side via stack, and the second metal trace, and wherein a SerDes signal differential impedance from the first and second BGA balls to the corresponding first and second C4 bumps has a variation of less than 10% in a time domain for a signal with a 25 Gb/s or higher data rate.

In another aspect of the present disclosure, a semiconductor chip package is provided comprising: a plurality of dielectric layers and a plurality of conductive layers interleaved with each other forming a stack of layers; wherein at least one of the conductive layers is a routing layer having first and second metal traces connected respectively to first and second vias; the first and second vias are connected to first and second plated-through-holes (PTHs) adjacent each other and which extend through the dielectric layers to connect to third and fourth vias; and a first and second ball grid array (BGA) pads forming a first plane coupled to the third and fourth vias, wherein the first and second BGA pads are rotated at a first angle greater than zero to a second plane formed by the first and second PTHs.

In another aspect of the present disclosure a semiconductor chip package is provided comprising: a plurality of dielectric layers and a plurality of conductive layers interleaved with each other forming a stack of layers; wherein at least one of the conductive layers is a routing layer having first and second metal traces connected respectively to first and second vias, wherein the first and second metal traces each including a designated initial segment having a predetermined length and a predetermined width which are different from a width of remaining portions of the first and second metal traces; the first and second vias are connected to first and second plated-through-holes (PTHs) adjacent each other and which extend through the dielectric layers to connect to third and fourth vias; a first and second ball grid array (BGA) pads forming a first plane coupled to the third and fourth vias, wherein the first and second BGA pads are rotated at a first angle greater than zero to a second plane formed by the first and second PTHs; at least a first and a second silicon die bumps (C4 bumps) formed on a top one of the plurality of conductive layers, wherein each C4 bump is electrically connected to the first and second metal layers; wherein the first and second C4 bumps are electrically coupled through the first and second vias, first and second PTHs and third and fourth vias to the first and second BGA pads; and wherein a SerDes signal differential impedance from the first and second BGA balls to the corresponding first and second C4 bumps has a variation of less than 10% in a time domain for a signal with a 25 Gb/s or higher data rate.

In another aspect of the present disclosure an optimization method is provided for a semiconductor chip package for high speed SerDes signals comprising: conducting signals with a 25 Gb/s or higher data rate on a routing layer of a plurality of conductive layers which are interleaved with a plurality of dielectric layers to form a stack of layers, wherein the routing layer has first and second metal traces which are connected to first and second vias; wherein the conducted signals travel through the first and second vias to first and second plated-through-holes (PTHs) adjacent each other and separated by a first distance which extend through the dielectric layers to connect to third and fourth vias; and wherein the conducted signals are transmitted through the third and fourth vias to a first and second ball grid array (BGA) pads forming a first plane and wherein the first and second BGA pads are rotated at a first angle greater than zero to a second plane formed by the first and second PTHs.

BRIEF DESCRIPTION OF THE DRAWINGS

FIG. 3a is a table showing the package substrate cross section used in a first embodiment of the present invention, a 10 layer organic buildup substrate.

FIG. 3b is a table showing the package substrate cross section used in a first embodiment of the present invention, a 14 layer organic buildup substrate.

FIG. 4a schematically illustrates the BGA ball and the bottom layer design of a conventional package design.

FIG. 4b schematically illustrates the BGA ball and the bottom layer design of the first embodiment of the present invention.

FIGS. 10a-10d schematically illustrate the SerDes differential pair design in a second embodiment of the present invention that carries a BGA ball pitch of 1 mm.

FIG. 11 is a table showing a comparison of package layout parameters between the first embodiment and the second embodiment.

FIG. 13 schematically illustrates an optimization method for determining optimum parameter values for the flip-chip package.

FIG. 16 is a table showing the package substrate cross section used in a third embodiment of the present invention for a 6 layer organic buildup substrate.

FIG. 17a schematically illustrates the BGA ball and the bottom layer design near the BGA ball of a conventional package design on layer 6.

FIG. 17b schematically illustrates the BGA ball and the bottom layer design near the BGA ball of the third embodiment of the present invention on layer 6.

FIG. 20a schematically illustrates the bottom metal layer design under the PTH of a conventional package design on layer 6. The SerDes differential signals were routed on this bottom layer from the BGA ball location to this location under the PTH. Then they will be routed up vertically through vias and PTH to the top metal layer. Eventually the signals will be routed to the C4 bumps on the top metal layer.

FIG. 20b schematically illustrates the bottom metal layer design under the PTH of the third embodiment of the present invention on layer 6.

FIG. 21a schematically illustrates the metal layer design under the PTH of a conventional package design on layer 5 (one layer above the bottom layer).

FIG. 21b schematically illustrates the metal layer design under the PTH of the third embodiment on layer 5 (one layer above the bottom layer).

FIG. 24a schematically illustrates the metal layer design above the PTH of a conventional package design on layer 2 (one layer below the top layer).

FIG. 24b schematically illustrates the metal layer design above the PTH of the third embodiment on layer 2 (one layer below the top layer).

FIG. 31 lists the package layout parameters for the third embodiment.

FIG. 32 shows the package layer stackup of the package substrate of the fourth embodiment. It lists layer thickness and electrical properties for each layer.

FIGS. 33a and 33b show the top metal layer design beneath the two SerDes signals' C4 bumps. As a comparison, the design of the fourth embodiment is shown in FIG. 33a and a traditional design is shown in FIG. 33b.

DESCRIPTION

Figure 1:
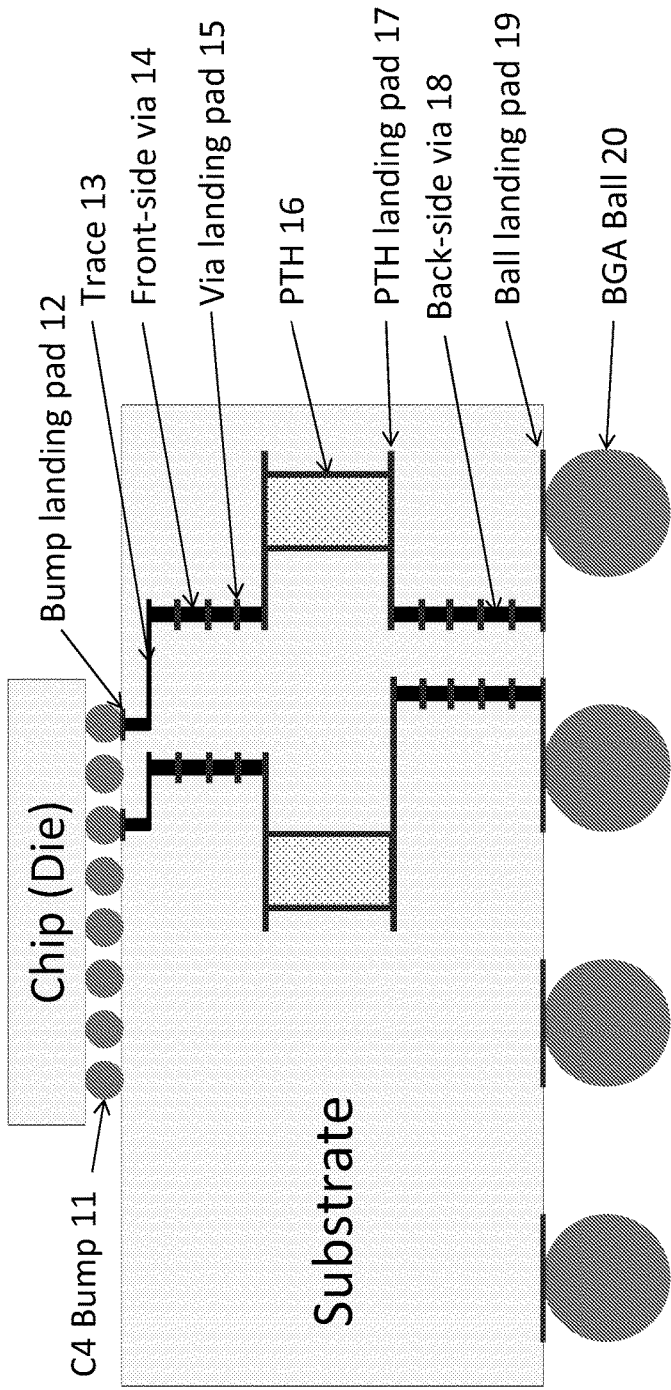
FIG. 1 schematically illustrates a cross-sectional view of a conventional flip-chip package with stripline structure.
Figure 2:
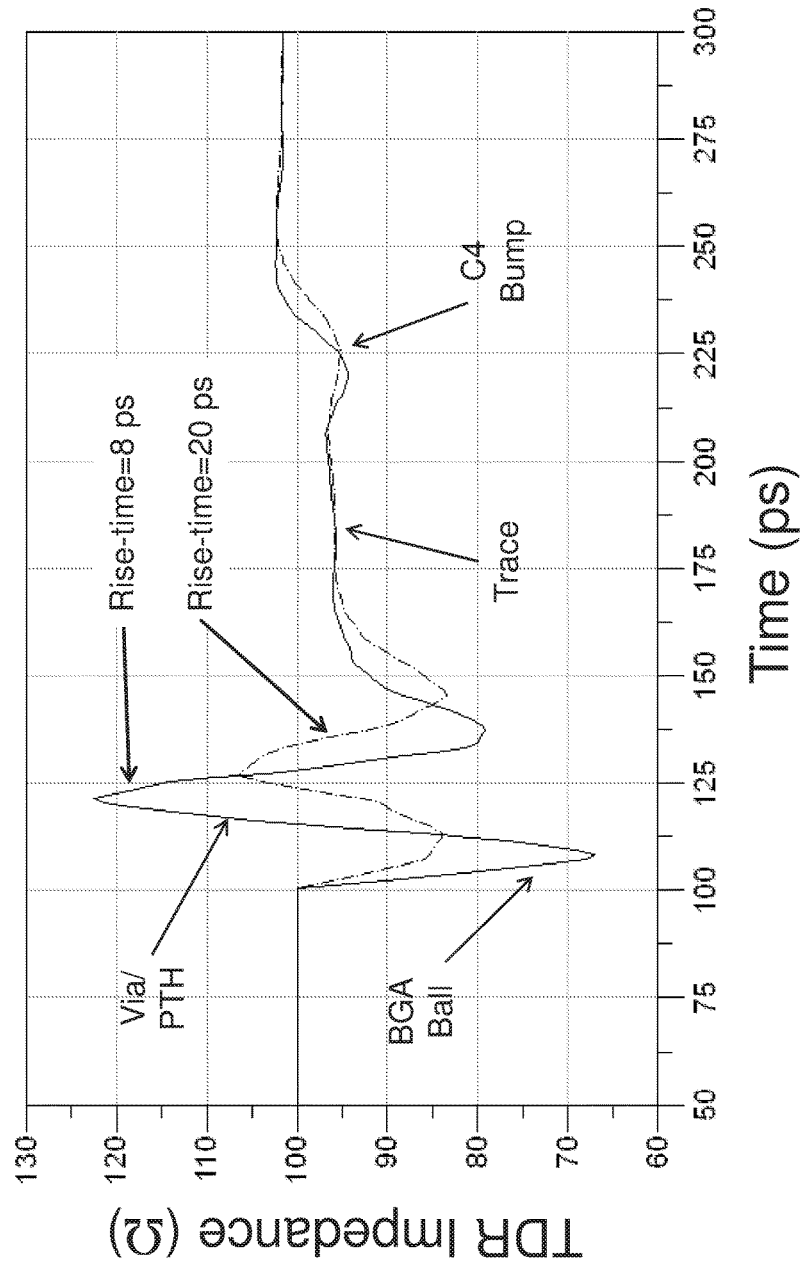
FIG. 2 illustrates package vertical interconnection's differential impedance discontinuity for the conventional flip-chip package and the significant rise of impedance variation when SerDes signal speed is increased from 10 Gb/s to 25 Gb/s and the signal rise time is reduced from 20 ps to 8 ps.

Today's semiconductor chip with high speed SerDes usually uses HFCBGA (Heat spreader Flip-Chip Ball-Grid-Array) package as its preferred package type. Due to the large I/O pin count and the associated large power and ground pins, these package body sizes tend to be large. Most of the time a 0.8 mm BGA ball pitch or a 1 mm BGA ball pitch is used to reduce large package warpage impact on PCB assembly and to leave enough space for PCB trace fan-out. Because of the large quantities of I/Os, these HFCBGA packages tend to have more than 6 metal layers in their substrate.

The first and second embodiments describe two typical cases which show that package differential impedance discontinuity can be reduced to <10% even when the signal rise time is <10 ps and the SerDes data rate is >25 Gb/s. A first embodiment uses a 10-layer HFCBGA package with a 0.8 mm BGA ball pitch and a 400 μm core. The package substrate has 4 buildup metal layers above a 2-layer laminate core substrate and another 4 buildup metal layers below the 2-layer laminate core substrate. This structure is typically called a 4-2-4 layer stackup. Core thickness is 400 μm. A second embodiment uses a 14-layer HFCBGA package with a 1 mm BGA ball pitch. For the increased pitch, the package body size may be larger. To prevent package warpage an 800 μm core is used. Another difference between the packages in the first and second embodiment is that the substrate vendors are different. As a result, the buildup dielectric layer thickness is increased from 30 μmin the first embodiment to 33 μmin the second embodiment and the electrical parameters for dielectric constant and loss tangent were slightly different. The structure of the second package is typically called a 6-2-6 layer stackup. Package design parameters provided in these two typical packages may be applied to other HFCBGA packages or used as the initial parameters for fine tuning.

The tables in FIGS. 3a and 3b show the substrate cross sections of the first example and the second example, respectively. Information on layer stackup and material electrical properties such as material name, layer thickness, and electrical parameters of copper conductivity, dielectric constant and loss tangent are listed. For the same material, electrical parameters of dielectric constant and loss tangent are slightly different between the two embodiments because different substrate suppliers provided different values. The two layer stackups are compliant with RoHS-6 (Restriction of Use of Hazardous Substances) requirements and have been widely used in the industry. The material names provided in the two tables are examples for explanation. Other materials may be used. In particular, with the advancement of the substrate material technology, they could be replaced with other better materials. For example, the buildup layer material ABF-GX13 could be replaced with ABF-GZ41 or ABF-GXE5. Their CTEs (Coefficient of Thermal Expansion) are closer to the CTE of the core layer material. This reduces stress when multiple vias are stacked above and/or below a PTH.

First Embodiment

FIG. 4b shows the design of the BGA ball and the bottom metal layer of the first embodiment of this invention. FIG. 4a shows the BGA ball and the bottom metal layer of a conventional 10 Gb/s design. In FIGS. 4a and 4b, the letter "G" indicates ground balls under the anti-pad. As shown in FIG. 4a, in the conventional design a SerDes differential pair is surrounded with fully populated ground BGA balls. The metal ground plane 41 covers all the SerDes areas and has all the ground BGA balls connected except in the antipad region 42. It relies on enlarging the antipad 42 size to optimize impedance by reducing the parasitic capacitance between the BGA ball and the ground plane. The shielding is not in the signal vertical propagation direction and their contribution to crosstalk reduction between adjacent SerDes signals is minimal. On the other hand, it dramatically reduces the impedance because of the large capacitive coupling between it and the SerDes signals.

The first embodiment of the present invention, shown in FIG. 4b, provides a practical solution to resolve this issue. In the illustrated region, a majority—6 out of 11—of ground BGA ball sites surrounding the SerDes differential signals are not populated with BGA balls. This situation can be easily achieved by covering their BGA ball landing pads with solder resist. There is no ground plane. Adjacent ground BGA ball landing pads are connected via 50 μm wide traces 44. In FIG. 4b, the circles without the letter "G" indicate that there is no ground ball under the landing pads 43. This design is good enough to have <5% impedance variation in one example. To further reduce parasitic capacitive coupling, more ground BGA balls sites can be de-populated, or some of the unused BGA ball landing pads may be eliminated. These options can be used as a way to adjust the coupling between the SerDes signal and the ground and therefore to optimize each individual design. In one example, the BGA ball height is 350 μm and the BGA ball diameter is 400 μm after reflow. The BGA ball landing pad diameter is 500 μm. Because the BGA ball has a large capacitance and it brings down the BGA ball impedance, the minimum allowable BGA ball height and diameter are used in assembly for a 0.8 mm ball pitch.

Figure 5:
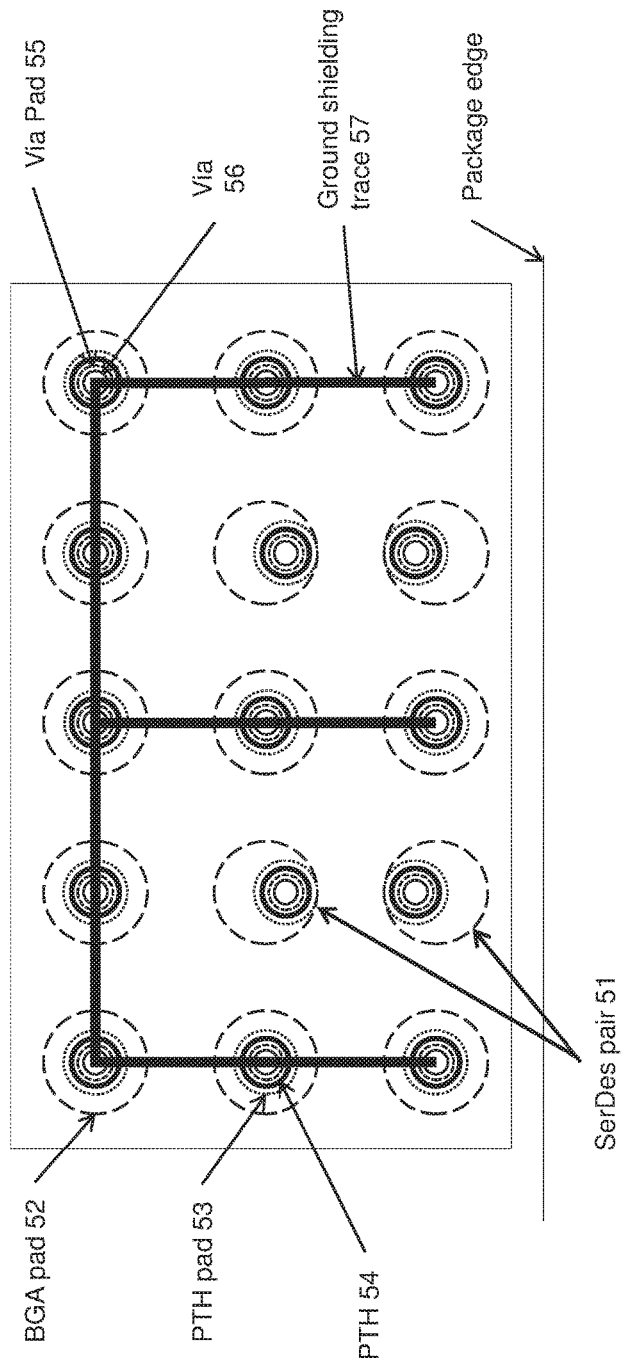
FIG. 5 schematically illustrates the substrate design from layer 10 to layer 6 in the first embodiment.

FIG. 5 is the top view of the substrate layout from layer 10 to layer 6 for the first embodiment. Shown in FIG. 5 are two SerDes pairs 51. They are surrounded by eleven BGA landing pads of ground. The largest dotted circle corresponds to the BGA landing pad 52 with a diameter of 500 μm. The middle dotted circle with a diameter of 300 μm and the thick solid circle with a diameter of 150 μm correspond to the PTH landing pad 53 and the PTH 54 respectively. The smallest dotted circle with a diameter of 100 μm and the smallest solid circle with a diameter of 60 μm correspond to via landing pad 55 and via 56 respectively. (Note that the drawings of these circles are not to scale.) Above each BGA pad, the interconnection vias and their PTH are all stacked and centered (i.e. their centers are aligned with each other). For each SerDes pair the PTH and via spacing is adjusted to 550 μm center to center to achieve <5% differential impedance variation. In other words, the PTH and via spacing for the SerDes pair is substantially smaller than the BGA ball pitch (0.8 mm for the first embodiment). As discussed in more detail later, this distance is used as a parameter to optimize differential impedance. There is no ground plane, and adjacent ground vias are connected via ground shielding traces 57.

Figure 6C:
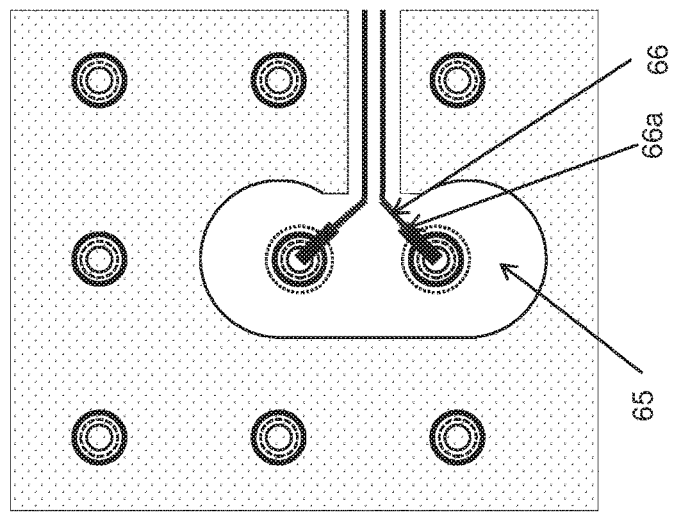
FIGS. 6a-6c schematically illustrate the substrate design from layer 5 to layer 2 in the first embodiment.
Figure 6B:
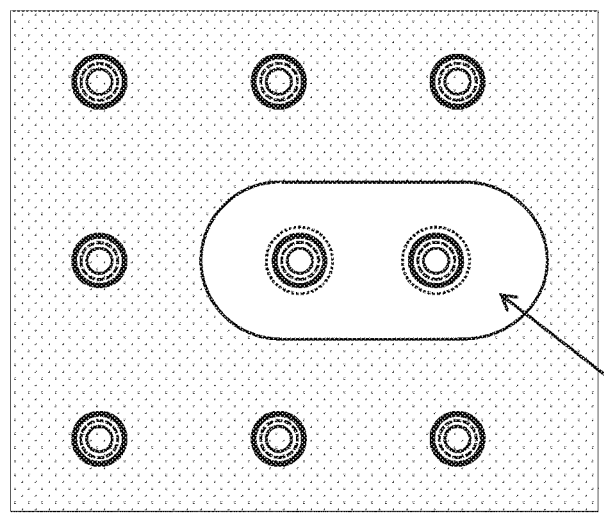
Figure 6A:
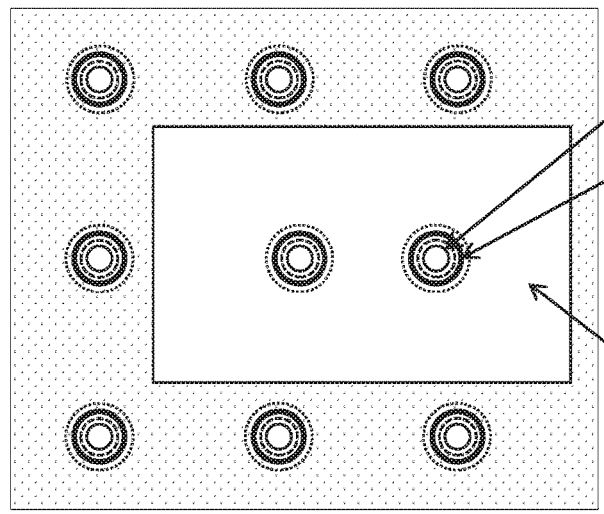

FIGS. 6a-6c show the layout from layer 5 to layer 2 for the first embodiment. As shown in FIG. 6a, the layouts for layer 5 and layer 4 are the same. On each layer a large part 61 of the ground area is removed (referred to as "ground void" in this disclosure), which helps to reduce capacitive coupling between the ground and the SerDes signals and raise the differential impedance. The amount of ground area to be removed on each layer and the shape of the removed area can be determined by 3D modeling and TDR analysis. In the illustrated embodiment the removed area (ground void) is a rectangular shape on each layer. Its width and height are 1100 μm and 1800 μm respectively. The SerDes vias 62 are stacked and centered with their respective PTH 63. Their vias' pitch is still kept at 550 μm.

FIG. 6b shows the layout for layer 3 in the first embodiment. Because there are SerDes differential traces on layer 2, the size of the removed portion 64 of the ground area on layer 3 is reduced to keep a stripline structure. The removed portion 64 has the shape of a typical antipad, with a width of 700 μm and a height of 1500 μm. SerDes via pitch still remains at 550 μm and the vias and PTH are stacked and centered.

Layer 2 layout is shown in FIG. 6c. The ground antipad 65 is similar to that in layer 3 in size and shape. The vias of the SerDes pair are stacked and centered with their respective PTHs and the via pitch is 550 um. For the two fan-out traces 66, their initial segments 66a which lead from the via landing pad outwardly are wider than the rest of the differential traces. The length and the width of these initial segments 66a can be used as parameters to optimize the overall TDR impedance for a smooth impedance transition from the vertical via to the horizontal trace.

Layer 1 has a solid ground plane. Together with ground plane of layer 3 they form a good stripline structure for SerDes differential traces to be routed on layer 2. Because of space constraints at the present, SerDes signals at C4 bumps are connected to the differential traces through direct via drop down right underneath each C4 bump. It should be noted that in most conventional designs too much ground is typically placed surrounding a SerDes pair, leading to a sudden drop of differential impedance. In embodiments of the present invention, an enlarged ground void is used which usually helpful to lower the sudden reduction in impedance. The impact of a larger ground void on crosstalk is minimal.

It should be noted that the via and PTH design of embodiments of the present invention meets the high volume manufacture (HVM) design rules from the substrate vendor. Although the design is not explicitly written in current design rule as allowable, it has been confirmed with two leading substrate vendors that the there are no issues with the design under an HVM environment. Meanwhile, the selection of the smaller height and diameter of the BGA ball after reflow can be met in high volume manufacturing at assembly house.

Figure 7:
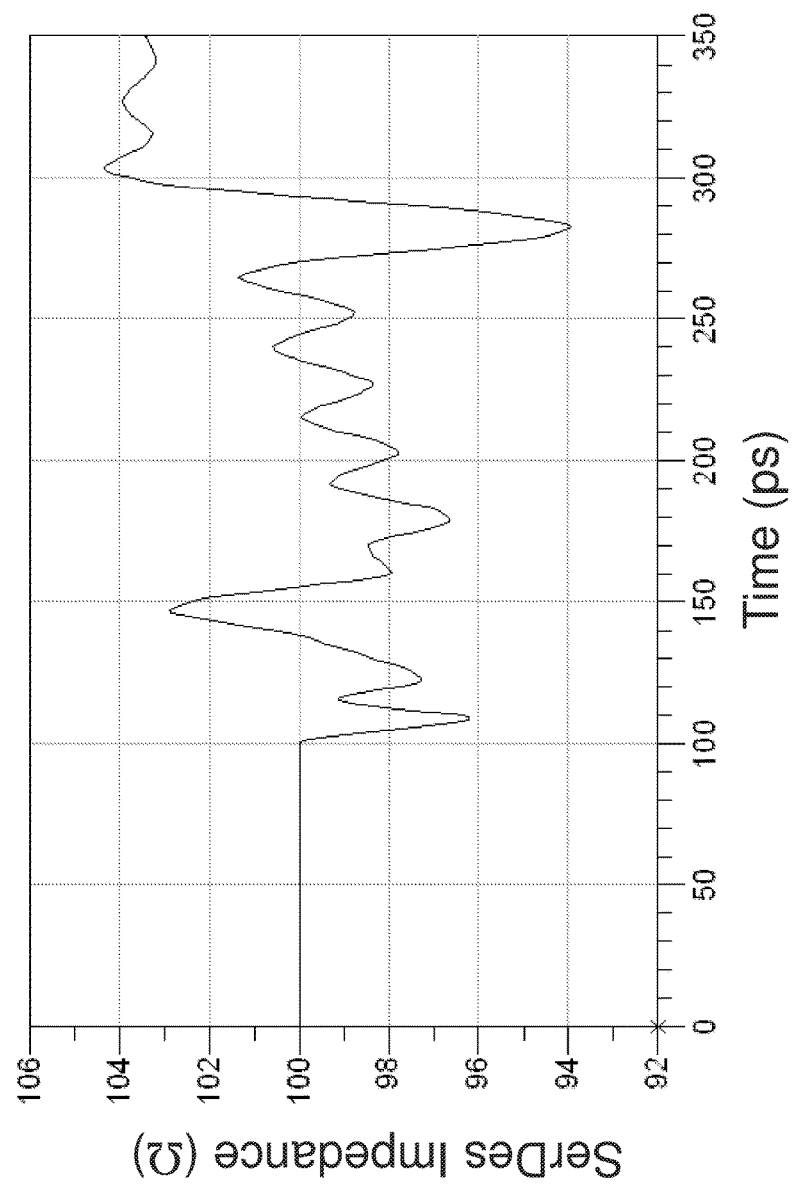
FIG. 7 shows the SerDes differential impedance in the first embodiment after 3D model extraction and TDR analysis.

FIG. 7 is a TDR plot of the SerDes differential impedance for the first embodiment. The model was extracted with a 3D electromagnetic field solver, HFSS (High Frequency Structure Simulator). To accommodate for 25 Gb/s data rate, the TDR rise time was set to be 8 ps. It can be seen from the graph that after impedance optimization for BGA ball, vias below PTH, PTH, vias above PTH, trace fan-out segment connected to via, and all the voids on each layer, the SerDes signal's differential impedance is controlled to 96 to 103 ohms, a variation of <5%. In FIG. 7, the first peak at about 110 psis the BGA ball impedance. It is optimized to be higher than 96 Ohms. The second peak at about 150 psis more related to the PTH impedance. It is controlled to be lower than 103 Ohms. Effects for vias below and above the PTH as well as the voids on each layer help manage the impedance in between.

Figure 8B:
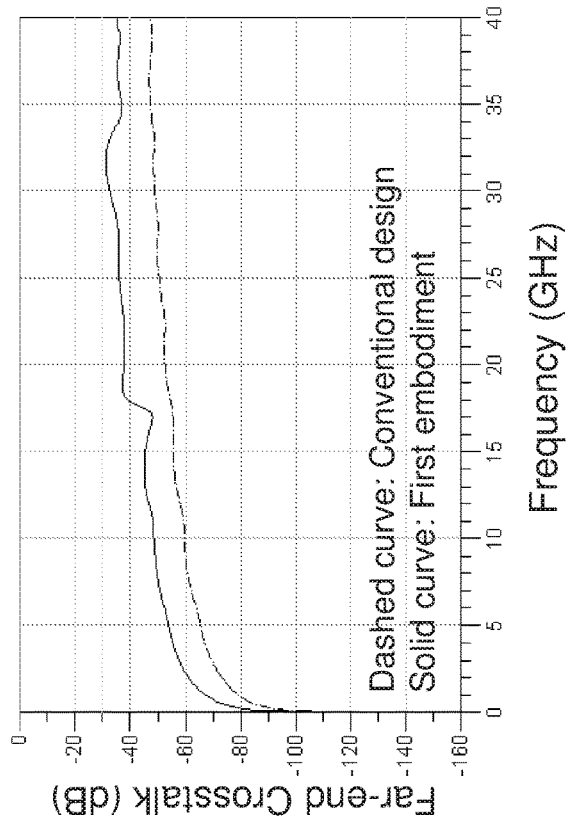
FIGS. 8a-8b show the near-end crosstalk and the far-end crosstalk of the first embodiment and comparison to those of a conventional design.
Figure 8A:
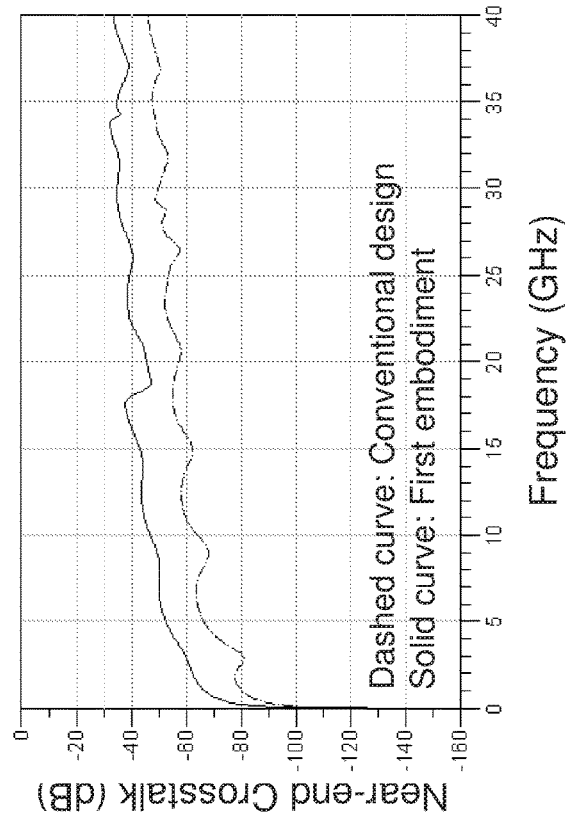

FIGS. 8a-8b show the near-end and the far-end crosstalk of two adjacent SerDes differential signal pairs for a conventional design (dashed curve) and for the design of the first embodiment after impedance optimization (solid curve). FIGS. 8a and 8b are for the SerDes differential mode at the bump side and the ball side, respectively. The impact to crosstalk is still minimal for the design of the first embodiment after optimization even though large voids were created on each metal layer below layer 3. For the first embodiment, both crosstalk values were <−30 dB from DC to 40 GHz. Total crosstalk to a SerDes differential pair should be less than −25 dB. Thus, it can be seen that excessive crosstalk is not present in the design of the first embodiment.

Figure 9A:
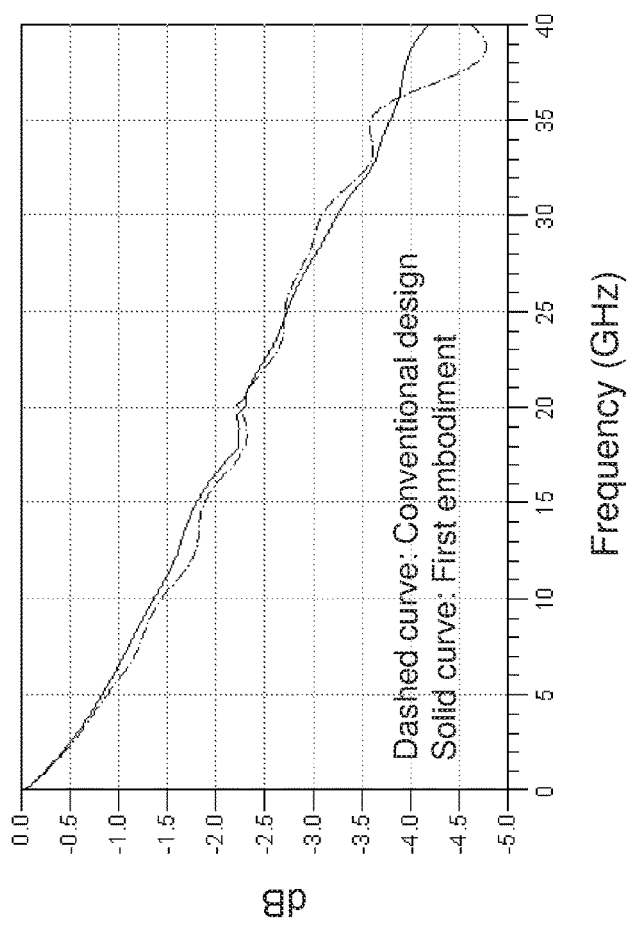
FIGS. 9a-9e show the insertion loss and the return loss of the first embodiment and comparison to those of a conventional design.
Figure 9C:
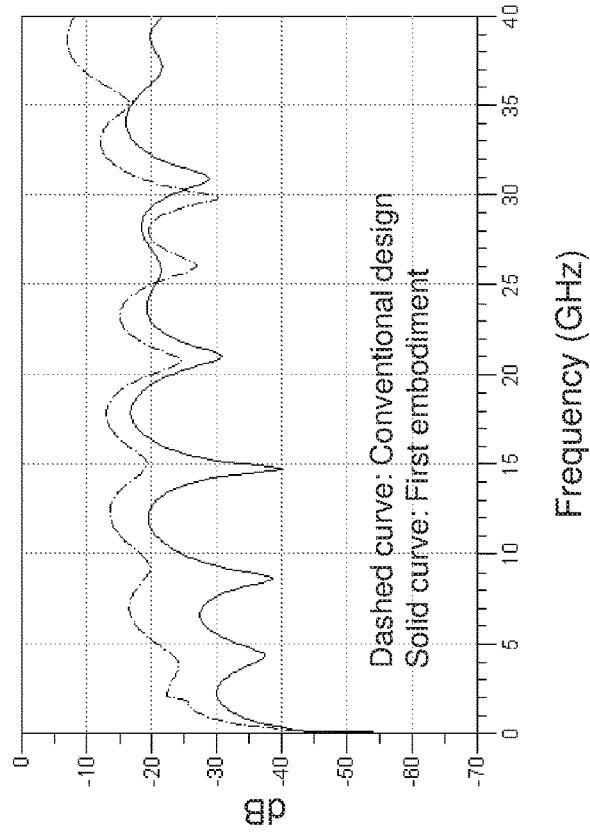
Figure 9B:
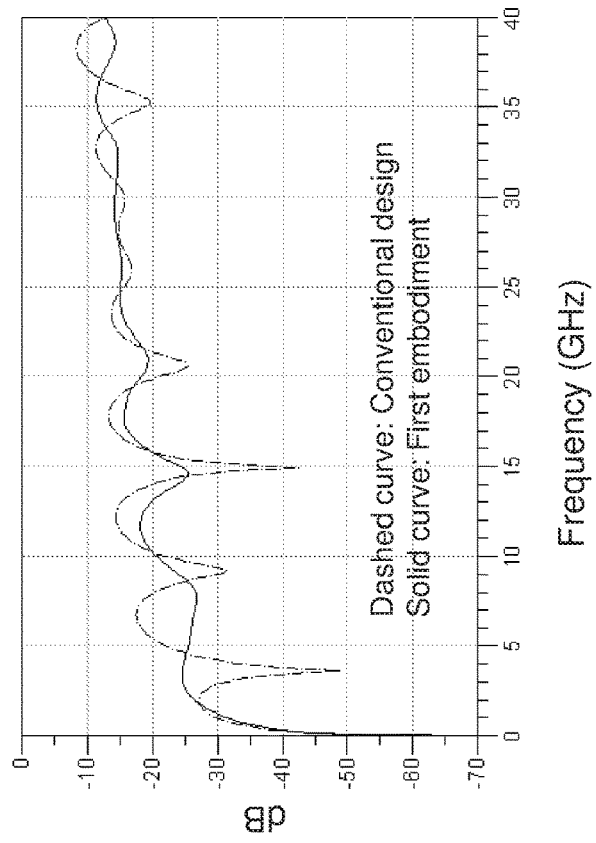
Figure 9E:
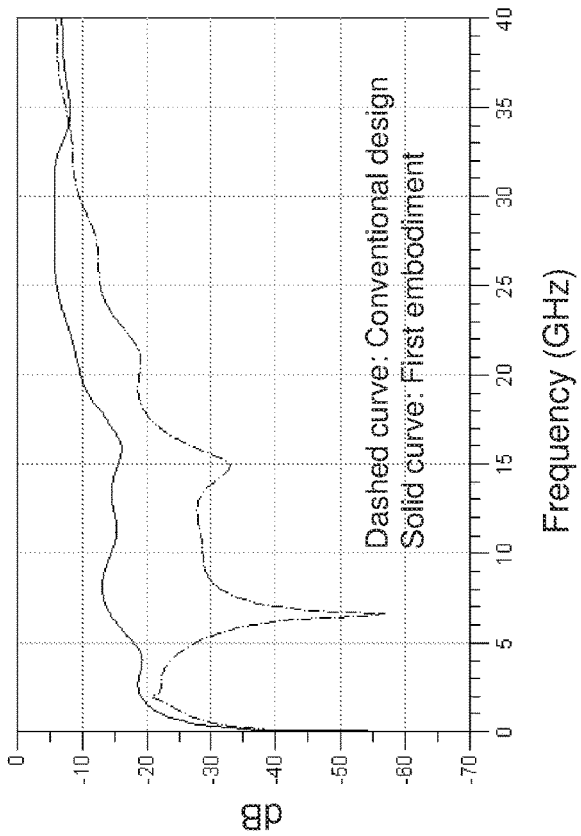
Figure 9D:
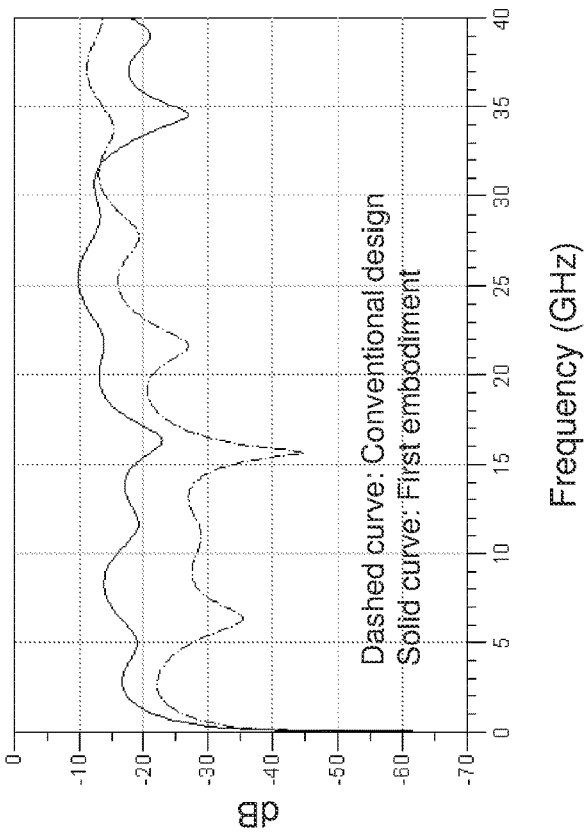

FIGS. 9a-9e show the insertion loss and the return loss of the SerDes differential signal for a conventional design (dashed curves) and for the design of the first embodiment after impedance optimization (solid curves). FIG. 9a shows the differential mode insertion loss. FIGS. 9b and 9c show the differential mode return loss at the bump side and the ball side, respectively. FIGS. 9d and 9e show the common mode return loss at the bump side and at the ball side, respectively. For the insertion loss, the optimization in the first embodiment had little impact. For the differential mode return loss, it became lower than −10 dB across the entire frequency spectrum from DC to 40 GHz after optimization (first embodiment). For the common mode return loss, it was still lower than −5 dB from DC to 40 GHz after optimization (first embodiment). The electrical simulation results in FIGS. 8a-8b and FIGS. 9a-9e show that there should be no concern that larger ground voids on each layer would lead to poor crosstalk and signal performance.

Second Embodiment

FIGS. 10a-10d illustrate the SerDes differential pair design according to a second embodiment of the present invention. To make the drawing easy to view, only the SerDes pair is shown; all its surrounding BGA landing pads, vias, PTHs, voids, and shielding are removed. FIG. 10a is a top view. FIG. 10b is a perspective view. FIG. 10c is a side view in a direction from the lower side of FIG. 10a and FIG. 10d is a side view in a direction from the right side of FIG. 10a.

As shown in FIG. 10a, a key difference between this design of the second embodiment and the design of the first embodiment is the "90 degree rotation" of the vertical plane that passes through the PTH 101 pair (and all the vias 102 above them on the upper side of the PTH) relative to the vertical plane that passes through the corresponding BGA ball pads 103. Also, the PTH 101 pair and the vias 102 above them are located at the center plane between the two BGA ball pads 103 and are kept equal distance to each of the two ball pads; the vias 104 below the PTHs 101 are located in the vertical plane through the two BGA ball pads 103 (so each PTHs 101 is also at equal distance to the two vias 104). Note here that the locations of the various components such as PTH, pad, etc. refer to the locations of their center or center line. This arrangement minimized the electromagnetic field coupling for vertical interconnections between everything below the bottom side of the PTH and everything above the bottom side of the PTH. This is because the electrical field of the PTHs is perpendicular to the electrical field of the BGA balls.

FIGS. 10a-10d also show the BGA pad to via pad connections 105, lower-side via to PTH connections 106, and SerDes differential traces 107.

One of the major challenges in the second embodiment is the enlargement of the BGA ball size due to the increase of BGA ball pitch. As shown in the table in FIG. 11, which shows a comparison of package layout parameters between the first embodiment (column labeled "1") and the second embodiment (column labeled "2"), from a 0.8 mm BGA ball pitch to a 1 mm BGA ball pitch the BGA ball height and width after reflow have increased from 0.35 mm and 0.40 mm to 0.40 mm and 0.50 mm respectively. This change dramatically increased the capacitive coupling between the two SerDes signals and pushed down the impedance of the BGA balls. As a result, the design in the first embodiment would not work for the second embodiment anymore. The "90 degree rotation" of the PTH and vias above it helps to bring up the BGA ball impedance. It also made the impedance optimization work easy when varying the pitches of the vias below the PTH, the PTH, and the via above the PTH because of the electrical field decoupling effect.

Another major difference between the first embodiment and the second embodiment is the spacing between the vias of the SerDes pair and between the PTHs of the SerDes pair. The first embodiment uses a single spacing of 550 μm for the PTHs and for the vias both above and below the PTHs. In the second embodiment the via spacing below the PTH is 280 μm and the via spacing above the PTH and the PTH spacing are 500 μm. For ground balls around the SerDes signal balls, the second embodiment only needs one ground ball adjacent to one of its two signal balls. The ground void design below the PTH for the first and second embodiments is the same.

A 50 μm ground trace is used to connect all the ground BGA ball pads in the second embodiment, similar to the first embodiment. A similar design with an enlarged antipad for each layer up to layer 3 above the PTH as in the first embodiment applies to the second embodiment as well. It should be noted that because there may be other SerDes traces routed near the SerDes pair, the antipad size may have to be adjusted to avoid ground void for other traces. On trace routing layer 2, similar to the first embodiment, trace shielding is used. Because of the difference of dielectric layer thickness between the two embodiments, the second embodiment employs the following design rules: trace width=25 m, trace spacing=60 m, and trace to shielding spacing=75 m. Layer 1 has a ground plane.

Figure 12:
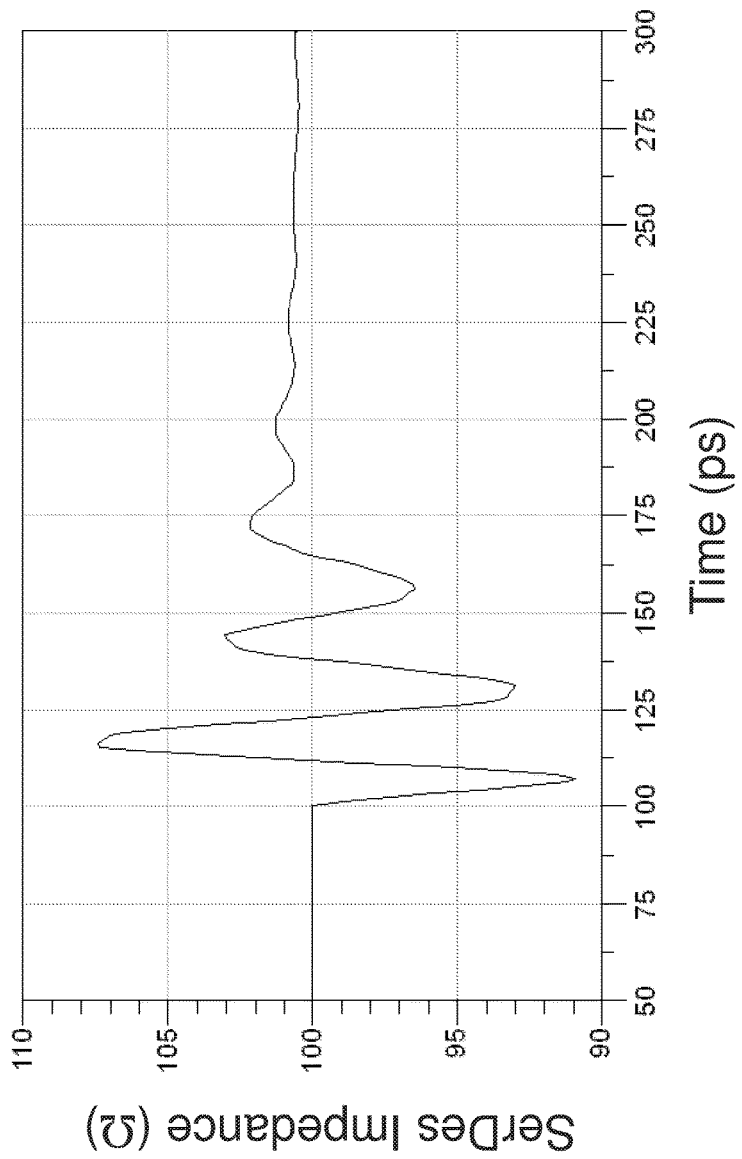
FIG. 12 shows the SerDes differential impedance in the second embodiment using 3D model extraction and TDR analysis.
Figure 14:
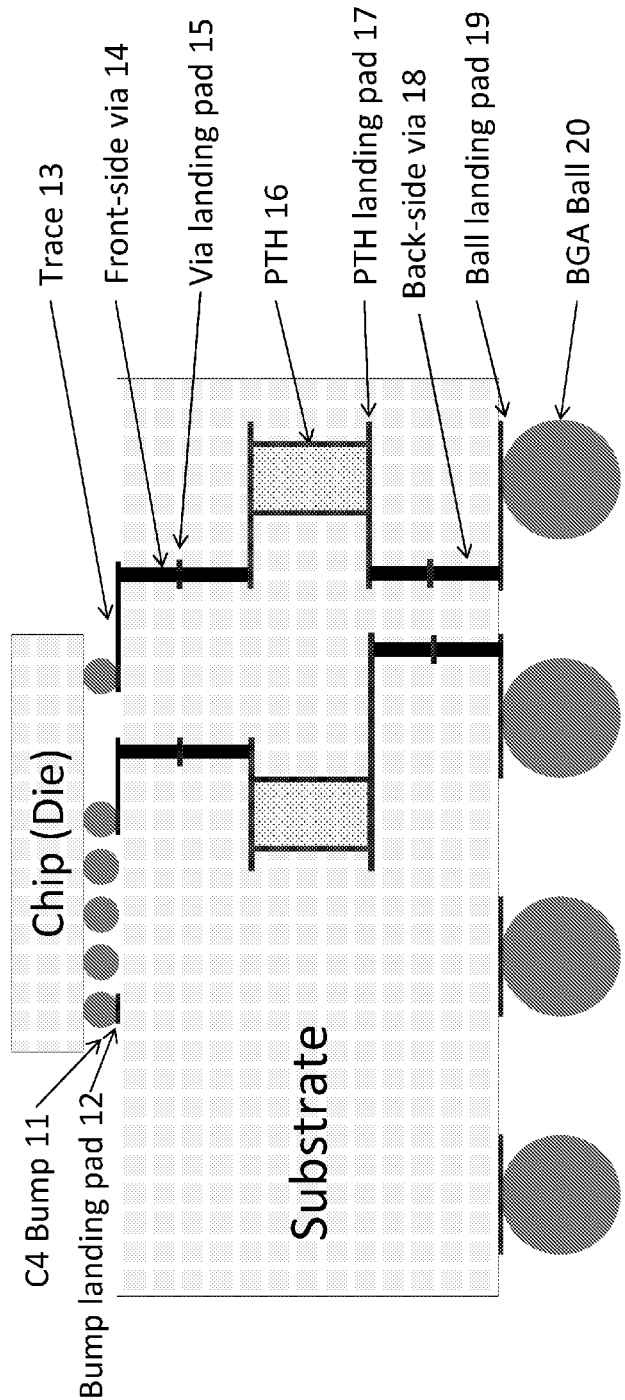
FIG. 14 schematically illustrates a cross-sectional view of a conventional flip-chip package with microstrip line structure.
Figure 15:
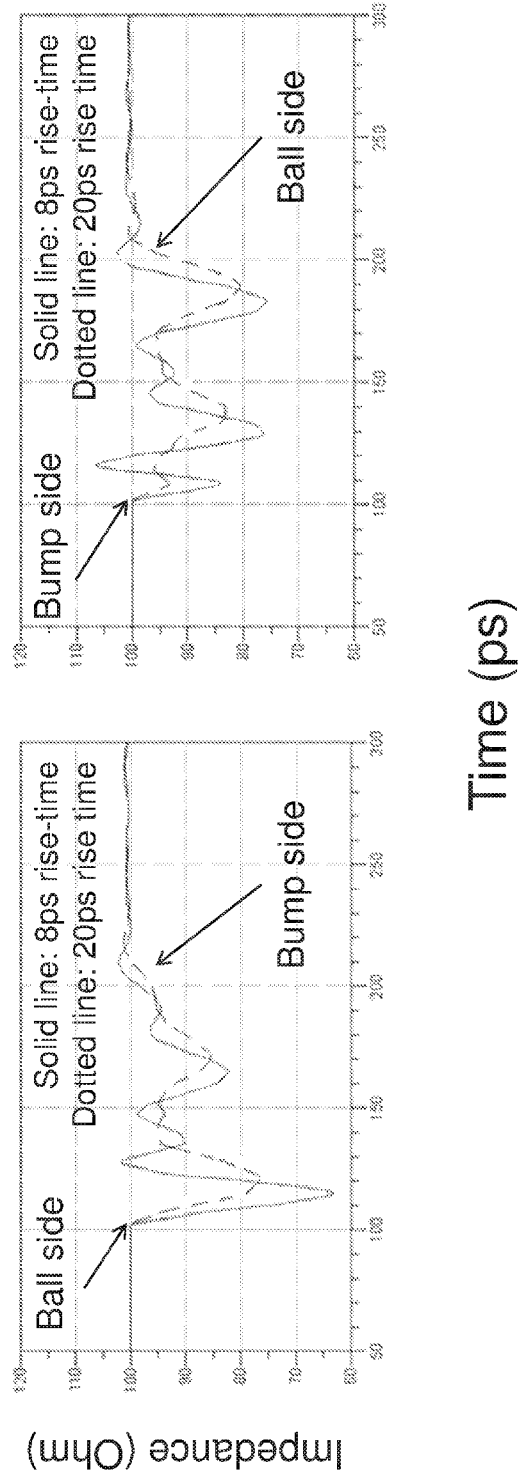
FIG. 15 illustrates package vertical interconnection's differential impedance discontinuity for the conventional flip-chip package and the significant rise of impedance variation when SerDes signal speed is increased from 10 Gb/s to 25 Gb/s and the signal rise time is reduced from 20 ps to 8 ps. Graph (a) is for the receiving signal (signal entering the BGA ball from PCB); graph (b) is for the transmitting signal (signal entering the bump from the die).

FIG. 12 shows the SerDes differential impedance for the second embodiment. It is optimized to be <10% variation from 100-Ohm nominal differential impedance even if the rise time is only 8 ps. This package design is suitable for SerDes signals over 25 Gb/s. The 1 mm BGA ball pitch and the 6-2-6 layer stackup allow the package to be used for high pin count applications. C4 bump and its via were included in the modeling. Their differential impedance is very close to the requirement of 100 ohms.

It should be noted that although the disclosure is targeted for signal transmission rate at 25 Gb/s and over, it can be used for data rate less than 25 Gb/s. In this case, longer transmission distance, better eye diagram, and reduced BER (Bit Error Rate) are expected. Although the disclosure used two common package layer counts and BGA ball pitches as examples to illustrate the design, the method is applicable to all BGA package designs for high speed SerDes applications.

It should be noted that all parameter values given in this disclosure are approximate values, and other suitable values may be used.

The two embodiments discussed above are two common cases. In practice, there are many different cases for a package substrate design. The diversity comes from variations of the following package design parameters: package substrate layer count, stripline or microstrip line of the SerDes signal, build-up dielectric layer thickness and its electrical property (dielectric constant and loss tangent), core dielectric layer thickness and its electrical property (dielectric constant and loss tangent), metal layer thickness, BGA ball height and diameter after reflow, BGA ball spacing of the SerDes signal pair, the ground BGA ball assignment/pattern around the SerDes signal pair, C4 bump height and diameter after reflow, C4 bump spacing of the SerDes signal pair, the ground C4 bump assignment/pattern around the SerDes signal pair, etc.

According to one aspect of the present invention, once a package design condition (all of the parameters mentioned in the previous paragraph) is defined, the following parameters may be used in differential impedance optimization for the vertical interconnection of a SerDes signal pair: via to via spacing below the core layer, PTH to PTH spacing in the core layer, rotation of the PTH-to-PTH plane with respect to the BGA-ball-to-BGA-ball plane (90 degrees or 0 degree, or other angles), via to via spacing above the core layer, and width and length of initial trace segment which connects the top via to the horizontal trace. Here via to via spacing is a controllable parameter because all vias below the core layer are stacked and centered and all vias above the core layer are also stacked and centered. Spiraled vias or randomly stacked vias are not recommended because their optimization is harder to implement. Also, stacked via arrangement is high volume manufacturable (6 stacked vias maximum as of today, and the allowable number of stacked vias expanding) and can achieve the ±10% differential impedance variation. It should be noted that, no matter what the via stacking arrangement is, the via to via spacing from one SerDes signal to another SerDes signal is a key parameter for differential impedance optimization. The via diameter or its landing pad diameter can also be changed to tune the differential impedance, but this optimization process might be more time consuming.

After a package layout is completed, differential impedance optimization for the SerDes vertical interconnections can be carried out. At this point, the package design condition as mentioned in the previous paragraph such as layer stackup, package body size, BGA ball pitch and the SerDes signals' C4 bump and BGA ball locations has been decided. As initial values in the optimization process, the structures and their parameters values for via, PTH, and void provided in the first and second embodiments described above may be used, or other initial values may be used as well. Ansys 3D full-wave electromagnetic (EM) simulation tool HFSS (High Frequency Structural Simulator) or a similar tool may be used as the simulation tool. After the EM simulation, the extracted S-parameter is turned into a TDR plot. Rise time may be set to 8 ps or to a value based on the actual rise time of the SerDes signal. The TDR plot is preferably based on raw data without data point smoothing. In the graph the differential impedance is plotted from the BGA ball to the C4 bump which is differentially terminated to a 100-ohm resistor.

Typically, the first peak in the graph is mainly caused by the BGA ball. Because the BGA ball is large, its capacitance is large. This results in the differential impedance of the first peak much lower than the desired differential impedance. The second peak is mainly caused by the PTH. Its value may be higher or lower than the desired differential impedance. The third peak is mainly caused by the vias above the PTH and the initial fan-out trace segment. The vias below the PTH affects the first peak and the second peak in a less significant way. Knowing which physical structure is the main contributor to a specific peak, the value of a peak can be raised or lowered by adjusting the spacing of the corresponding physical structure.

It should be noted that a peak's value is not solely determined by the corresponding physical structure. In fact, its neighboring physical structures' contribution cannot be neglected if the impedance discontinuity at the interface is large and therefore the reflection is not negligible. This is because the impedance is determined by dividing the total voltage by the total current. It is understood that the total voltage or the total current at a particular point is a vector summation of all the waves passing through that point. For a non-uniform differential impedance system, reflected waves from each impedance discontinuity interface contribute to the total voltage and current. Their impact on the differential impedance needs to be considered. Because of this the TDR impedance optimization may take several iterations. For example, the inventor has observed the impact of C4 bump dimension to the first peak during simulations. Although it is small, it cannot be neglected.

In one implementation of the optimization procedure, the differential impedance value of the first peak is first tuned to be within +10% of the desired differential impedance. Then the second peak value is tuned. During the tuning process for the first peak, the second peak's value may become worse; this is acceptable as the second peak's value will be adjusted later on. Similarly, when tuning the second peak, the third peak's value may become worse, but its optimization can be left to the next stage. The process may be repeated. After a few iterations, the overall impedance curve can be within +10% of the desired differential impedance. The optimization procedure is summarized in FIG. 13.

In summary, embodiments of the present invention provide vertical interconnection structures that employ BGA/via/PTH in an organic package substrate, where, by controlling various parameters, the SerDes differential impedance can be optimized for signals of 25 Gb/s and beyond. In one aspect, the invention is directed to vertical interconnection structures that have certain structural features, which permit controlling of their parameters for SerDes differential impedance optimization. In another aspect, the invention is directed an optimization method that optimizes SerDes differential impedance by controlling various structural parameters of the vertical interconnection structures.

The structural features that are different form conventional package designs and that can be used for optimization are summarized below.

Via structure and via spacing: In conventional packages, the main requirement in via design is to achieve the vertical interconnection from BGA pad to C4 bump pad while meeting the design rules. Traditionally, due to practical concerns such as mechanical stress etc., stacked vias beyond two to three layers was not used. With the advancement of substrate manufacturing technology in recent years, stacking several vias becomes doable for high volume manufacturing. Implementations of the present invention use a simple via structure, where all the vias are stacked and centered both below and above the PTH. While such vertical stacking via structure is not new (it is favored in some designs because it eliminates the need for horizontal traces connecting vias from adjacent layers), controlling the via spacing for optimization purpose has not been done before. In embodiments of the present invention, using such a stacked via structure, via spacing between a SerDes' positive signal and negative signal is a parameter that is tuned in the SerDes TDR differential impedance optimization process.

PTH structure and PTH spacing: In conventional packages, the PTH spacing and the direction of the vertical PTH plane (passing through the two vertical PTHs of a SerDes signal pair) with respect to the vertical BGA ball plane (passing through the two BGA balls of the same SerDes signal pair) are not used to optimize impedance. For ease of layout, these two planes are typically in the same direction, but are typically not merged into one plane, meaning the two PTHs are not on the center line across the two BGA balls centers. No conventional designs have adopted the perpendicular direction of the PTH plane with respect to the BGA ball plane. In embodiments of the present invention, the PTH spacing is used as a parameter to optimize the SerDes TDR differential impedance. If the BGA ball dimension is small as is the case in the first embodiment for the 0.8 mm BGA ball pitch and if the BGA ball differential impedance is within the design range, then the PTH plane and the BGA ball plane can be merged into one plane. If the BGA ball dimension is large as is the case in the second embodiment for the 1 mm BGA ball pitch and if the BGA ball differential impedance is below the design range, then the 90 degree PTH plane orientation is desired. In this situation the two PTHs are kept at an equal distance away from the two BGA ball centers. The orientation angle can also be used as a parameter to fine tune the SerDes TDR differential impedance.

Fan-out trace. In conventional packages, the initial trace segment connecting the via to the horizontal parallel differential trace has the same trace width as the rest of the parallel differential trace. If the trace is routed from the C4 bump to the BGA ball, this trace segment is called the fan-out trace. In embodiments of the present invention, the trace width and length of an initial segment of the fan-out traces are fine tuned to optimize the SerDes TDR differential impedance. Because of the larger spacing between the initial segments of the two fan-out traces, widening the trace width from the via to a certain distance is helpful to smooth the impedance.

Ground plane void and antipad enlargement. In conventional packages, for layers below the PTH, the ground planes are not provided with large voids; only antipads are used. As understood by those skilled in the relevant art, antipads typically have a round shape around the vias. In some conventional packages, in layers above the PTH, the antipad is enlarged, but the enlarged amount is often arbitrary. In embodiments of the present invention, most planes above the PTH (including the top PTH layer) are provided with large voids that are substantially larger than conventional antipads. As long as the nearby routing signals have a ground or power return-path plane, it is preferable to maximize the void size. Below the PTH (including the bottom PTH layer), most layers are almost completely free of the ground plane, with only a 50 um metal trace used as the shielding on each layer. The trace is also a path that provides the ground return current. Here the 50 um width can be made a little wider or narrower. It is a fine tuning parameter for impedance.

Some other parameters are not used in the above-described optimization process, but in implementations of the present invention their values may be different from those commonly used in conventional package designs to improve SerDes differential impedance. The considerations and preferred ranges for some of these other design parameters are discussed below.

Note that conventional package designs typically follow the JEDEC (Joint Electron Device Engineering Council) standard for BGA ball pitch. The standard is 1.27 mm, 1 mm, 0.8 mm or 0.65 mm et al. Sometimes a conventional package may have several different BGA ball pitches in different locations of the package. For example, if routed diagonally for a 0.8 mm BGA ball pitch package, a SerDes pair's BGA ball pitch will become 1.13 mm (0.8×1.414). The first and second embodiment discussed above, as well as the discussion below, focus on two most commonly used BGA ball pitches, i.e., 0.8 mm and 1 mm, but the principle applicable to other pitches as well.

BGA ball height, size, pad: For 0.8 mm BGA ball pitch packages, 0.5 mm or 0.6 mm diameter BGA balls (before reflow) have been conventionally used. For the 1 mm BGA ball pitch, 0.6 mm or 0.63 mm diameter BGA balls (before reflow) have been conventionally used. In various implementation of the present invention, smaller BGA balls are used to lower capacitive coupling, specifically, 0.5 mm and 0.6 mm balls for the 0.8 mm pitch and 1 mm pitch, respectively.

In conventional designs there are no strict requirements for BGA ball height and diameter after reflow. In conventional packages, for the 0.8 mm pitch and 0.5 mm diameter before reflow, the ball height or stand off after reflow ranges from 0.3 mm to 0.5 mm and the ball diameter after reflow ranges from 0.4 mm to 0.6 mm. The inventor discovered that smaller BGA balls are more desirable for the purpose of reducing capacitive coupling between the two SerDes BGA balls, leading to increased BGA ball differential impedance closer to 100 ohms. Thus, in embodiments of the present invention, the BGA ball height is controlled to be about 0.35 mm and the BGA ball diameter is about 0.4 mm after reflow. For this purpose, smaller diameter BGA balls before reflow are used. In assembly the 0.5 mm ball may be too large and an even smaller diameter ball such as 0.4 mm may be needed. Also, in PCB assembly the solder paste material thickness may have to be reduced to achieve the required 0.35 mm stand off and the 0.4 mm after-reflow diameter.

Similarly, in conventional packages, for the 1 mm pitch and 0.6 mm diameter before reflow, the ball height or stand off after reflow ranges from 0.4 mm to 0.6 mm and the ball diameter after reflow ranges from 0.5 mm to 0.7 mm. In implementations of the present invention, 0.4 mm height and 0.5 mm diameter after reflow are used; to reduce capacitive coupling, the smaller diameter BGA ball before reflow are used. In assembly the 0.6 mm ball may be too large and an even smaller diameter ball such as 0.5 mm may be needed. Also, in PCB assembly the solder paste material thickness may have to be reduced to achieve the required 0.4 mm stand off and the 0.5 mm after-reflow diameter.

On the other hand, the BGA ball height and diameter after reflow cannot be too small. Because due to the CTE (Coefficient of Thermal Expansion) mismatch of different package material, a package is typically warped. On the other hand, the PCB is relatively flat because the board is thicker and its material is harder. Soldering a warped package on a flat surface requires that the BGA ball height and diameter cannot be too small. Otherwise, there might be reliability issues due to stress and cracking. Therefore, the BGA ball size as discussed above in implementation of the present invention is the result of various competing considerations including impedance optimization and practical considerations; these values are recommended as they are practical in fabrication and are the smallest values currently permitted by manufacturers. However, the invention is not limited to these particular BGA ball sizes.

The BGA ball landing pad diameter is usually 100 um larger than the BGA ball pad opening. Too large a diameter will increase capacitive coupling; too small a diameter will create an alignment issue in high volume manufacturing.

Ground BGA balls: In conventional designs, ground BGA ball sites around a SerDes pair are always fully populated, as it is generally believed they help to shield the SerDes signals and in turn lower crosstalk among adjacent SerDes signals. However, the impact of excessive ground BGA balls on differential impedance has been ignored in conventional designs. In implementations of the present invention, only one ground BGA ball around a SerDes pair is necessary to provide a ground path for return current. As a result, crosstalk is acceptable and differential impedance can be dramatically improved.

Via diameter and via pad: Standard via diameter of 60 um and via pad of 100 um may be used in embodiments of the present invention, but larger via diameter and via pad are also possible. In the optimization process in some implementations of the present invention, these two parameters are not used as tuning parameters because changing the via to via spacing is sufficiently effective for optimization, and tuning these two parameters requires more work in layout for optimization. In other implementations, these two parameters may be used as tuning parameters for optimization.

PTH diameter and PTH pad: Standard PTH diameter of 150 um and PTH pad of 300 um may be used in embodiments of the present invention, but larger PTH diameter and PTH pad are also possible. For one substrate manufacturer, 250 um PTH pad is standard. In implementations of the present invention, 150 um for PTH diameter and 300 um for PTH pad may be used. In the optimization process in some implementations of the present invention, these two parameters are not used as tuning parameters because changing the PTH to PTH spacing is sufficiently effective for optimization, and tuning these two parameters requires more work in layout for optimization. In other implementations, these two parameters may be used as tuning parameters for optimization.

Third Embodiment

The third embodiment is a novel design in BGA ball assignment, via and PTH placement, metal void and shielding balance, and trace width adjustment near the transition location are provided. Different from the first and second embodiments which used stripline structure for horizontal interconnection, the third embodiment uses microstrip line structure routed on top and bottom metal layers for horizontal interconnection. The advantage of microstrip line over stripline is that package substrate layout count can be reduced and the packaging cost can be lowered. It should be noted that the design of the third embodiment uses standard package substrate design rules and can be manufactured in high volume without the increase in cost, and can pass rigorous quality and reliability tests.

Compared to the relatively expensive ceramic package, today, the HFCBGA (Heat spreader Flip-Chip Ball-Grid-Array) package with organic substrate is still the preferred package type for 25 Gb/s SerDes chips in today's semiconductor industry. Because of the large I/O pin count and the associated large power and ground pins, these package body sizes are usually large. Most of the time a 0.8 mm BGA ball pitch or a 1 mm BGA ball pitch is used to handle the package warpage on PCB assembly and to leave enough space for PCB trace fan-out. To relieve routing congestion, these HFCBGA packages tend to have 6 or more metal layers in their substrate. To reduce substrate layout count for the purpose of lowering package cost, high speed SerDes signals are routed on the top and bottom metal layers of a substrate.

The third embodiment uses a typical case to show that package differential impedance discontinuity can be controlled to <+10% when SerDes traces are routed as micro stripline on the top and bottom substrate layers and even when the signal rise time is <10 ps and the SerDes data rate is >25 Gb/s. The embodiment uses a 6-layer HFCBGA package with a 1 mm BGA ballpitch and a 400 µm core. The package substrate has 2 buildup metal layers above a 2-layer laminate core substrate and another 2 buildup metal layers below the 2-layer laminate core substrate. This structure is typically called a 2-2-2 layer stackup. Package design parameters provided in this typical package may be applied to other HFCBGA packages or used as the initial parameters for fine tuning.

The table in FIG. 16 shows the substrate cross section of the package substrate. Information on layer stackup and material electrical properties such as material name, layer thickness, and electrical parameters of copper conductivity, dielectric constant and loss tangent are listed. The layer stackup is compliant with RoHS-6 (Restriction of Use of Hazardous Substances) requirements and has been widely used in the industry. The material names provided in the table are an example for explanation. Other materials may be used. In particular, with the advancement of the substrate material technology, they may be replaced with other better materials. For example, the buildup layer material ABF-GX13 may be replaced with ABF-GZ41 when running 25 Gb/s signals, and the solder mask material PSR-4000 AUS703 may be replaced with PSR-8000 AUS410. Their CTEs (Coefficient of Thermal Expansion) are closer to the CTE of the core layer material. This reduces stress when multiple vias are stacked above and/or below a PTH. Their electrical parameters especially the loss tangent (dissipation factor) is better.

FIG. 17*b* shows the design of the bottom metal layer of the third embodiment of this invention. FIG. 17*a* shows the bottom metal layer of a conventional 10 Gb/s design. In FIGS. 17*a* and 17*b*, the letter "G" indicates ground balls under the BGA ball pads. As shown in FIG. 17*a*, in the conventional design a SerDes differential pair is surrounded with fully populated ground BGA balls. Because it was believed that more grounding around a SerDes differential pair will enhance signal quality and reduce crosstalk. Sometimes, many ground vias 244 as shown in FIG. 17*a* are laid out near the SerDes differential pair to provide even better grounding. The metal ground plane 241 covers all the SerDes areas and has all the ground BGA balls connected except in the antipad region 242. It relies on enlarging the antipad 242 size to optimize impedance by reducing the parasitic capacitance between the BGA ball and the ground plane. The shielding is not in the signal vertical propagation direction and their contribution to crosstalk reduction between adjacent SerDes signals is minimal. On the other hand, it dramatically reduces the impedance because of the large capacitive coupling between the shielding and the SerDes signals.

The embodiment of the present invention, shown in FIG. 17b, provides a practical solution to solve this problem. In the illustrated region, a majority—4 out of 5—of ground BGA ball sites surrounding the SerDes differential signals are not populated with BGA balls. This arrangement can be easily achieved by removing the BGA ball landing pad 243. There is no ground plane. The differential traces are routed on the bottom metal layer. To compensate for the increased separation between the two SerDes signals at the beginning of the routing near the BGA ball, the width of the enlarged trace 245 is increased from 25 um to 60 um at the initial segment. This design can offer <±10% impedance variation at the horizontal to vertical transition. To further reduce parasitic capacitive coupling, more ground BGA balls nearby can be de-populated. This option can be used as a way to adjust the coupling between the SerDes signal and the ground and therefore to optimize each individual design. The BGA ball landing pad size is reduced from 580 um in FIG. 17a to 450 um in FIG. 17b. As a result the ball height is 350 μm and the BGA ball diameter is 400 μm after reflow. Because the BGA ball has a large capacitance and it brings down the BGA ball impedance, the minimum allowable BGA ball height and diameter are used in assembly.

Figure 18B:
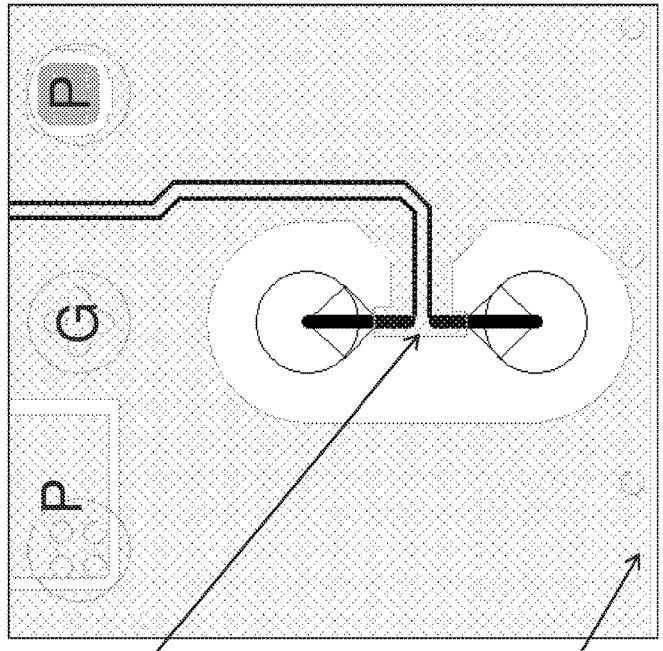
FIG. 18b schematically illustrates the metal layer design near the BGA ball of the third embodiment of the present invention on layer 5 (one layer above the bottom layer). For clarity, the SerDes differential signals' routing on the bottom metal layer is shown to indicate the relative position of the ground shielding metal with respect to the routing traces.
Figure 18A:
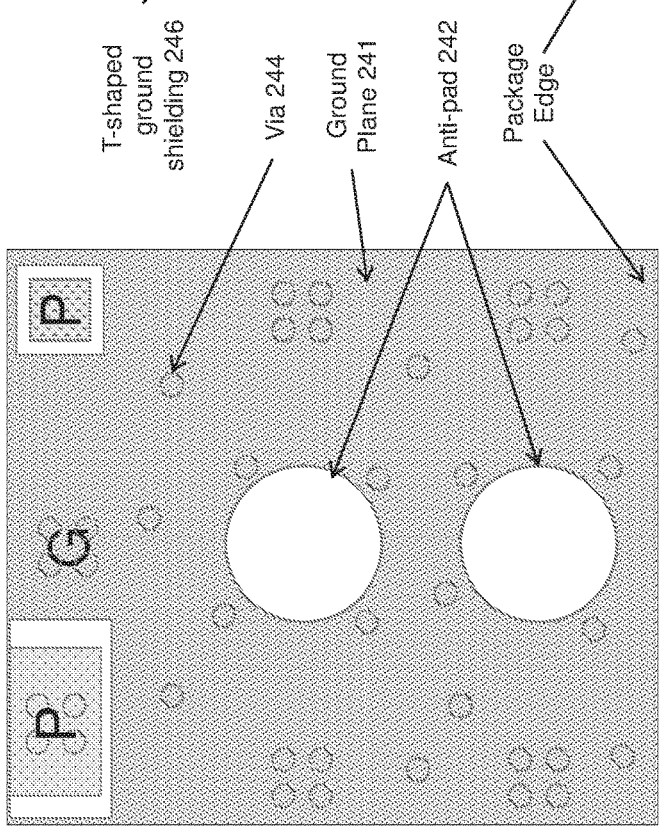
FIG. 18a schematically illustrates the metal layer design near the BGA ball of a conventional package design on layer 5 (one layer above the bottom layer).

FIGS. 18a and 18b show the top view of the substrate layout for layer 5 near the SerDes BGA balls. This is the metal layer right above the bottom metal layer. To make our explanation easier to understand, the bottom metal layer shown in FIG. 17b with two SerDes signal traces and two BGA ball landing pads are also shown in FIG. 18b. The superposition of the two metal layers on FIG. 18b helps us explain the position of the stick out tongue which looks like a 90-degree rotated T-shaped ground shielding 246 for better micro stripline impedance control. This shape looks like a 90-degree rotated railroad track cross section. It should be noted that the optimization of this stick out shape helps lower impedance discontinuity for SerDes signals' transition from vertical propagation via BGA balls to horizontal propagation via traces. In FIG. 18b, the anti-pad width is 887 um (X direction) and its length is 1879 um (Y direction). The stick out tongue's length is 507 um (X direction). At the beginning, the tongue width's shrinking angle is 45 degree. Its narrowest width is 266 um (Y direction). The length of the narrowest region is 200 um (X direction). The tongue's tip width is 407 um (Y direction) and the length is 135 um (X direction). Compared to FIG. 18a, the conventional package design, all vias surrounding the SerDes are removed in FIG. 18b and two antipads are combined into 1 larger antipad. It should be noted that the values provided here are good for this example. They could be used as a good starting point for other designs.

Figures 19A, 19B:
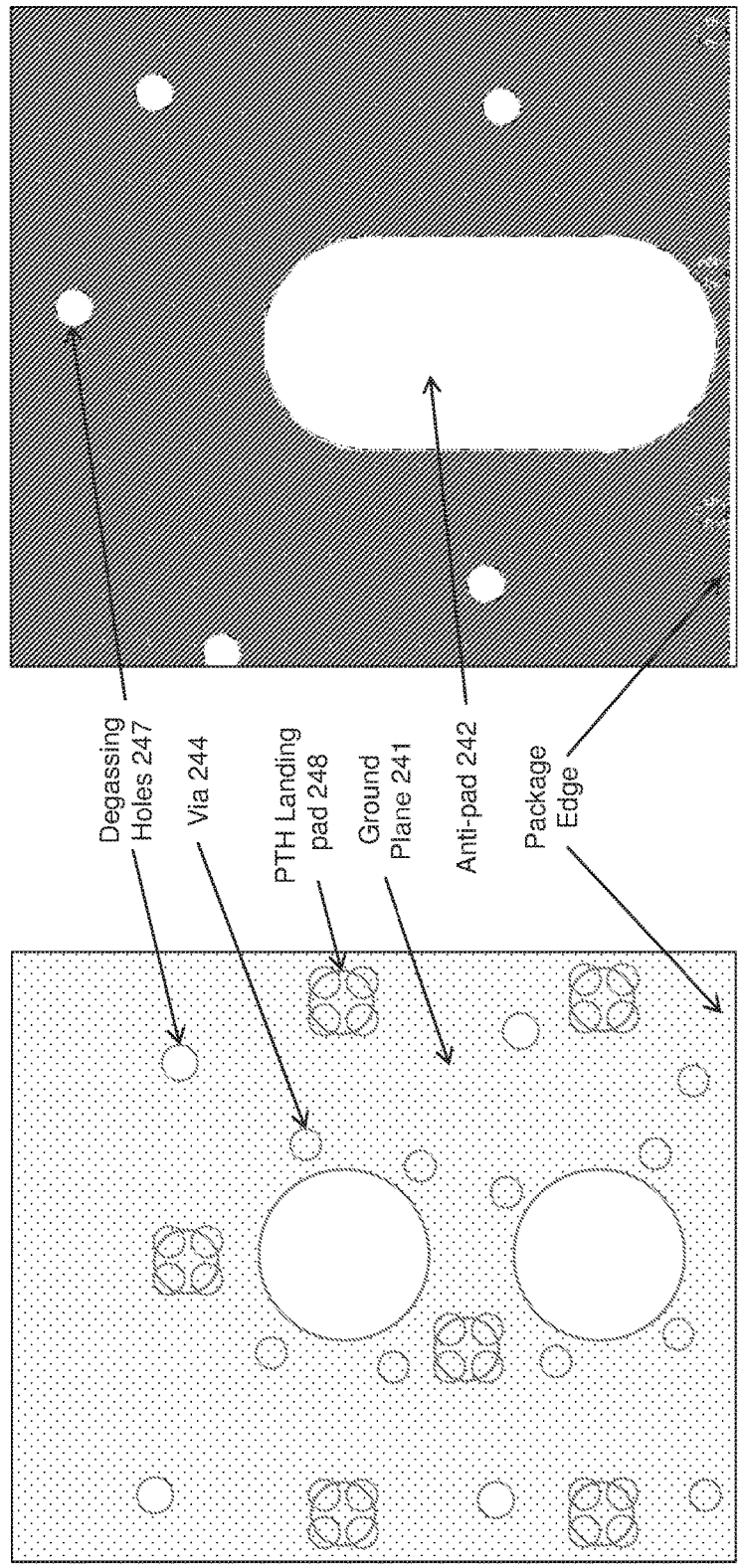
FIG. 19a schematically illustrates the metal layer design near the BGA ball of a conventional package design on layer 4 (two layers above the bottom layer).
FIG. 19b schematically illustrates the metal layer design near the BGA ball of the third embodiment of the present invention on layer 4 (two layers above the bottom layer). It should be noted that all irrelevant ground vias surrounding the SerDes pair and those un-welcomed PTHs were removed.

FIGS. 19a and 19b compare the metal layer 4 substrate design above the BGA ball region between a conventional design and this embodiment. This layer is two metal layers above the bottom metal layer and it is still on the lower side of the substrate. In the conventional substrate design of FIG. 19a, there are 5 ground BGA balls surrounding the SerDes pair. Hence, there are 5 PTH landing pads 248. Additionally, there is a PTH landing pad in between the two SerDes signals making the total of 6. Also, multiple vias are placed around each SerDes pair. In the embodiment of FIG. 19b all irrelevant ground vias surrounding the SerDes pair and those un-welcomed PTHs were removed. This helps reduce the capacitive coupling and reach the desired differential impedance. Degassing holes 247 are required in fabrication process to remove air bubble and to avoid de-lamination between adjacent layers.

After horizontal routing at the bottom of the substrate as a micro stripline for the SerDes signal pair, now the signals are close to the die edge and they will be brought up to the top metal layer. FIGS. 20a and 20b show the bottom metal layer region where the SerDes PTHs are located. The prior art is shown in FIG. 20a and the embodiment is shown in FIG. 20b. In FIG. 20a via spacing is 200 um and the two differential traces were not routed symmetrically. Electrical simulation is not performed to achieve the optimal impedance for the SerDes pair. Instead, an arbitrary value is used. While in FIG. 20b via spacing is adjusted to 294.5 um based on the optimization of HFSS simulation and the two SerDes traces are routed symmetrically. Because the BGA balls are not underneath the PTHs and the substrate layer count is less than 10, the capacitive coupling effect is not that strong. Therefore, stacked vias above and below the PTHs does not have to be used. In FIG. 20a there is a ground BGA ball landing pad and several vias. In the embodiment all nearby vias are removed and the ground BGA ball landing pad is also eliminated.

FIGS. 21a-21b show layer 5 around the PTH of the conventional design and this embodiment. This metal layer is right above the bottom metal layer. There are several differences. First, as described before, via pitch is increased. All these vias are stacked vias with their centers aligned. The $2^{nd}$ difference is for the embodiment all ground vias near the SerDes signal pair are removed for reasons provided above.

Figure 22B:
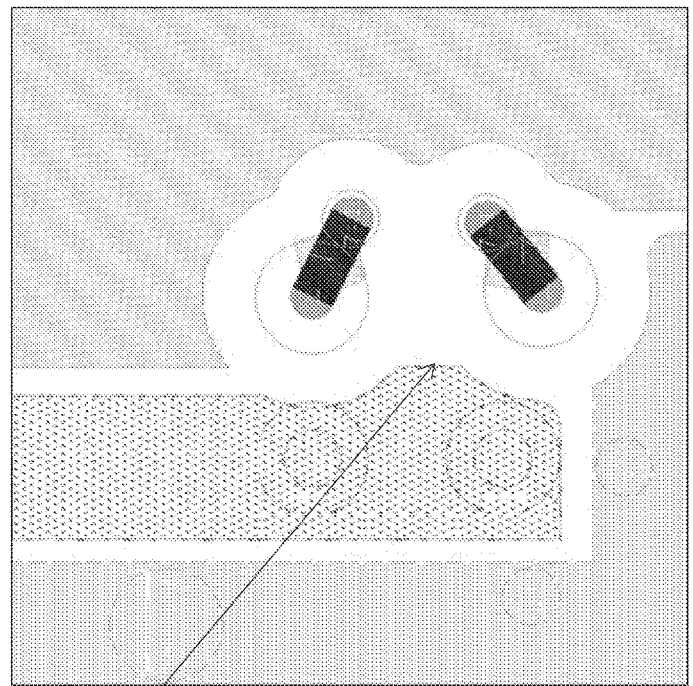
FIG. 22b schematically illustrates the metal layer design under the PTH of the third embodiment on layer 4 (two layers above the bottom layer).
Figure 22A:
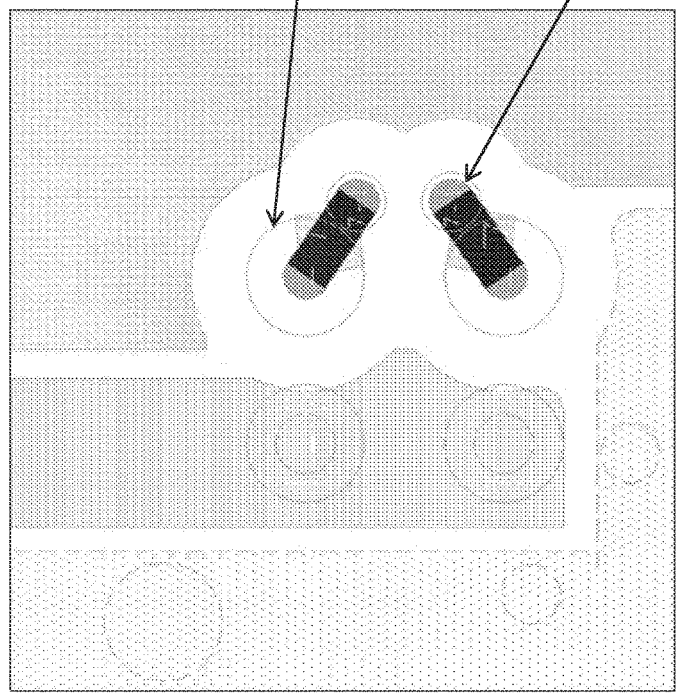
FIG. 22a schematically illustrates the metal layer design under the PTH of a conventional package design on layer 4 (two layers above the bottom layer).

FIGS. 22a-22b show layer 4 near the PTH of the conventional design and this embodiment. Once again, the center aligned via pitch is different. The PTH pitch is also different. In the conventional design, the PTH pitch is 415 um. This value might not have been optimally determined by HFSS simulation. In this embodiment, the pitch is carefully chosen to be about 500 um after HFSS optimization. As a result, the antipad formed by three power supply islands is pushed out further for the embodiment. Finally, in FIG. 22b, a cutout 249 is applied to encourage the mutual electromagnetic field coupling within the SerDes pair.

Figure 23B:
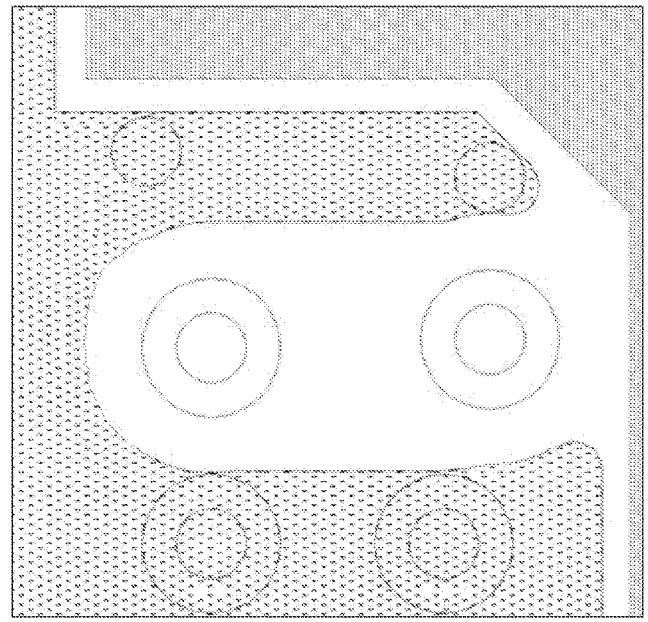
FIG. 23b schematically illustrates the metal layer design above the PTH of the third embodiment on layer 3 (two layers below the top layer).
Figure 23A:
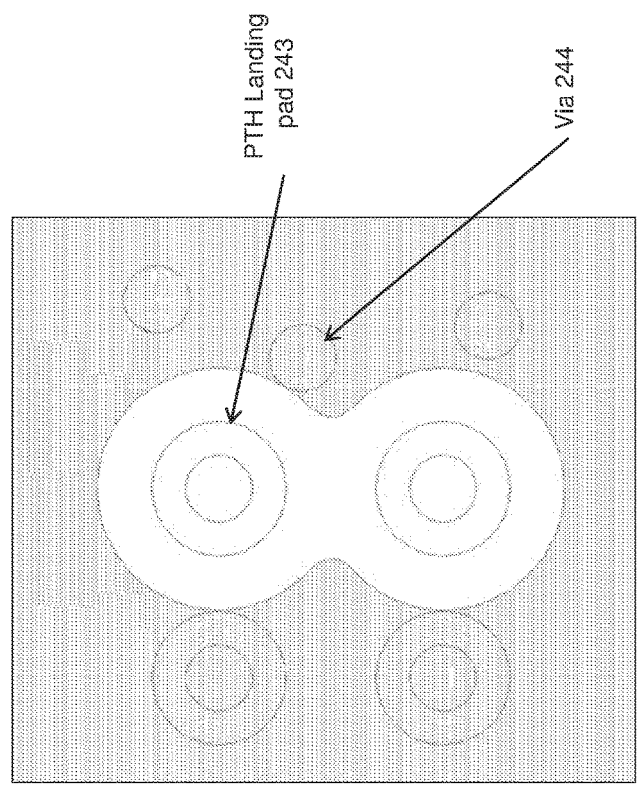
FIG. 23a schematically illustrates the metal layer design above the PTH of a conventional package design on layer 3 (two layers below the top layer).

FIGS. 23a-23b show layer 3 near the PTH of the conventional design and this embodiment. This metal layer is two metal layers below the top metal layer. As described before the PTH pitch is larger and the antipad size is bigger in FIG. 23b. Via 244 is removed to reduce parasitic capacitance coupling.

FIGS. 24a-24b show layer 2 near the PTH of the conventional design and this embodiment. This metal layer is one metal layer below the top metal layer. The major difference is the via pitch difference. Another difference is the antipad shape difference. In FIG. 24b, the right edge of the antipad 242 is cut to be straight for the purpose of reduced capacitive coupling.

Figure 25B:
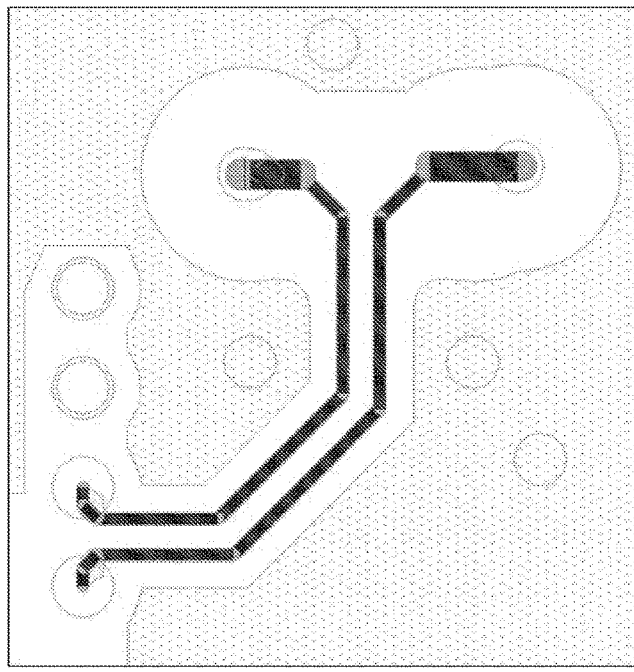
FIG. 25b schematically illustrates the top metal layer design under the bump of the third embodiment.
Figure 25A:
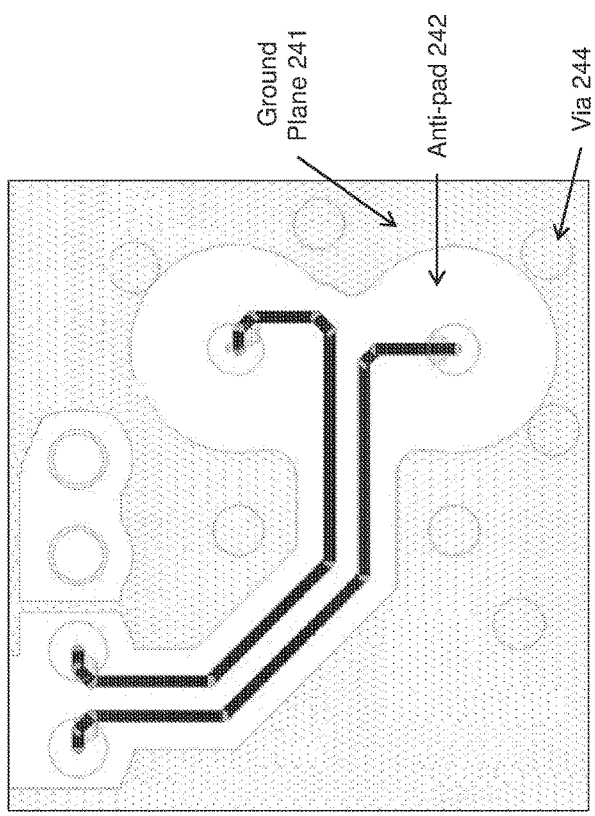
FIG. 25a schematically illustrates the top metal layer design under the bump for a conventional package design.

FIGS. 25a-25b show the top metal layer of the conventional design and this embodiment. The SerDes traces are connected from the PTH area to the C4 bump. Notice, again, the initial segment from via/PTH region has a wider trace width of 60 um which is determined by HFSS optimization. And the two traces are relatively symmetrical. While in the conventional design, the trace width remains unchanged from beginning to end and their fan-out at via/PTH region is a little asymmetrical. The last difference is the stick out tongue of the antipad at the right side. In FIG. 25b, the cutout is optimized by HFSS for a smooth impedance transition from vertical to horizontal using HFSS simulation.

Figure 26:
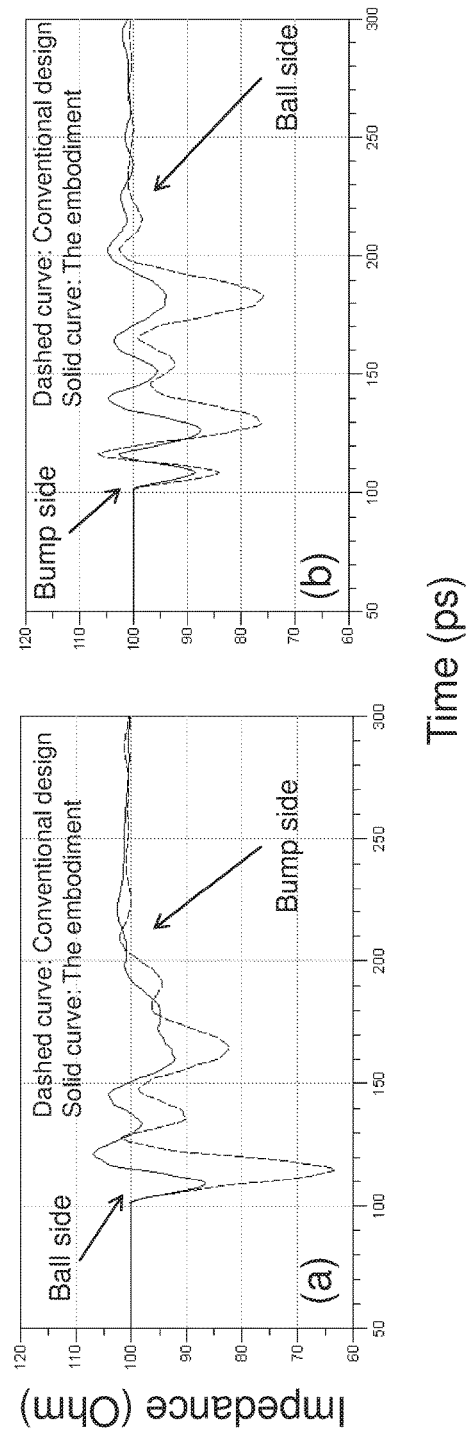
FIG. 26 shows the SerDes differential impedance in the third embodiment after 3D model extraction and TDR analysis. This curve is shown as the solid line. In comparison, the impedance of a conventional package design is also shown as the dashed line. In the TDR analysis, if an incoming signal enters the BGA ball from PCB, then the impedance is plotted in graph (a). This is the receiving signal. If an incoming signal enters the bump from the die, then the impedance is plotted in graph (b). This is the transmitting signal.

FIG. 26 shows the modeled TDR differential impedance between the conventional design and this embodiment. If a signal propagates toward the BGA ball from outside the package, then the graph is graph (a). This is equivalent to a receiving signal for the chip. If a signal propagates toward the C4 bump from the die, then the graph is graph (b). This is a transmitting signal of the chip. It can be seen from the plots, regardless of the propagation directions, the embodiment reduces the impedance to be <±10%. This improvement lowers signal reflection and return loss. As a result, it allows more energy to enter chip's detector for a receiving signal and more energy to be transmitted out of the chip resulting in enhanced eye quality and longer propagation distance.

Figure 27:
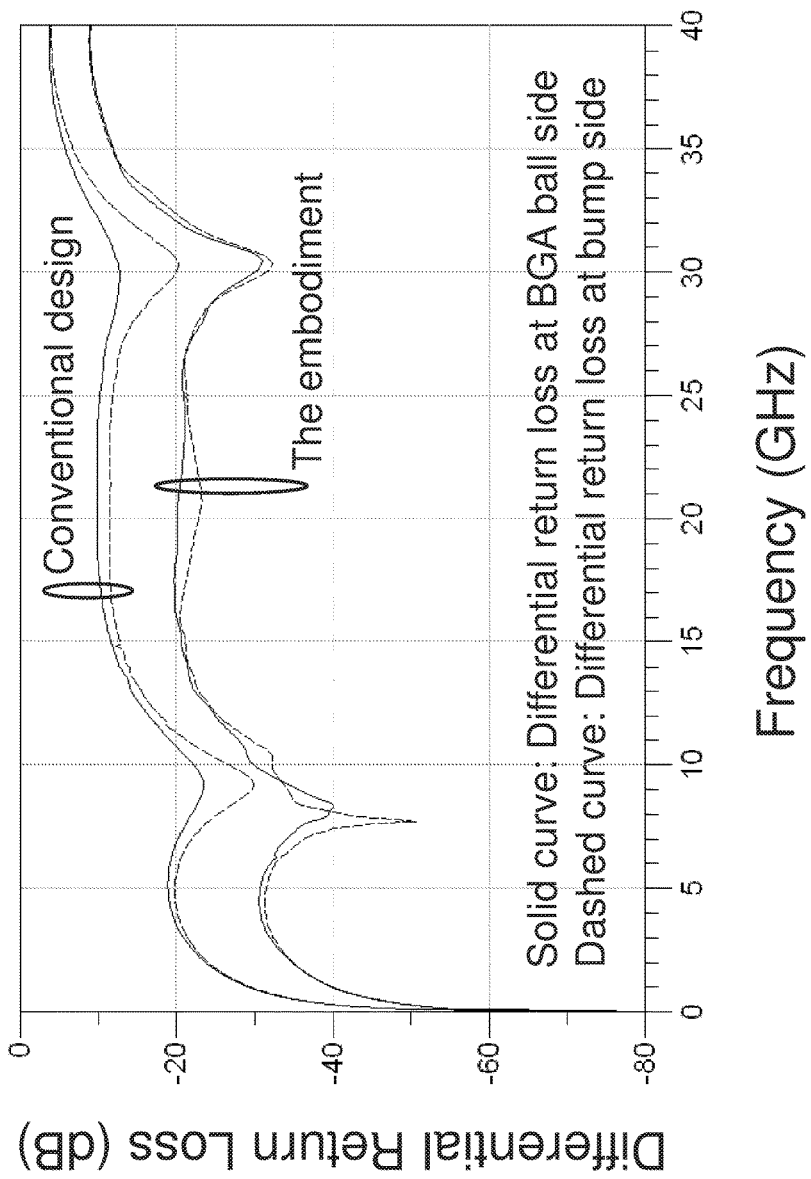
FIG. 27 shows the SerDes differential return loss between a conventionally design package and the third embodiment at BGA ball side and at bump side. The embodiment has a nearly 10 dB return loss improvement across the entire frequency spectrum.

FIG. 27 shows the differential return loss at BGA ball side and at bump side. As expected, the higher return loss belongs to the conventional package design and the lower return loss is from this embodiment. From 15 GHz to 25 GHz the conventional design offers −10 dB return loss, whereas, the embodiment is able to push down the return loss curve below −20 dB from DC to 30 GHz.

Figure 28:
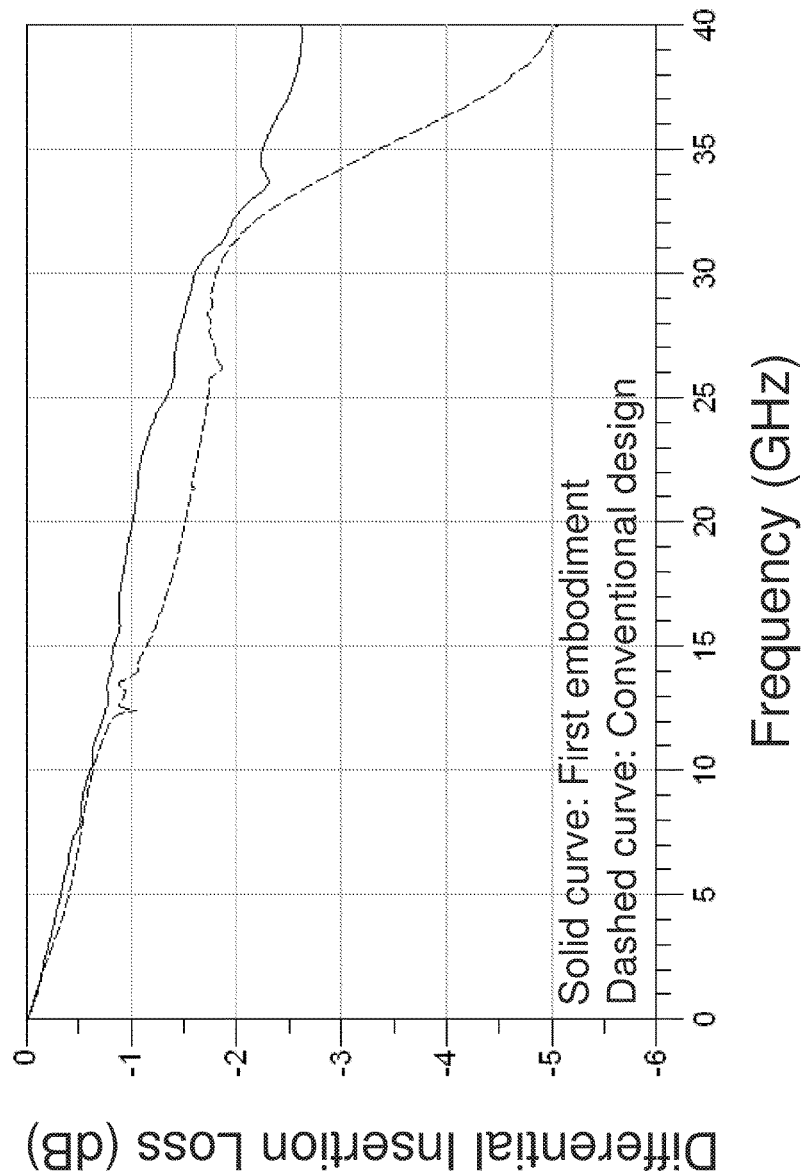
FIG. 28 shows the insertion loss improvement of the embodiment in comparison to those of a conventional design. The third embodiment's insertion loss is linear in the whole frequency spectrum. Whereas, the conventional design's insertion loss abruptly drops after 30 GHz and at 40 GHz it is nearly 2.5 dB worse than the embodiment.

FIG. 28 shows the differential insertion loss. Notice, the embodiment produces a relatively straight line from DC to 40 GHz. This makes the SerDes chip designer easier to compensate the insertion loss. But the conventional design has an insertion loss dropping rapidly after 30 GHz making engineers hard to compensate the insertion loss.

Figure 29:
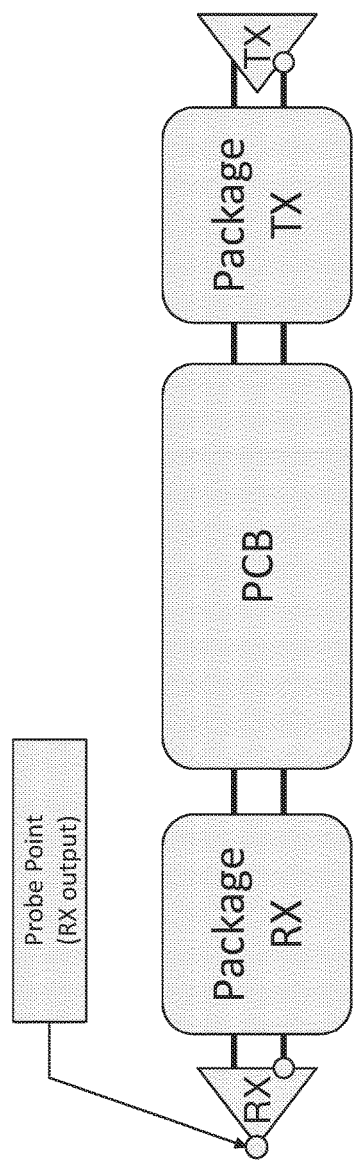
FIG. 29 shows a channel loopback simulation setup. It allows the simulation of an eye diagram and a bathtub curve for bit error rate analysis.

FIG. 29 shows a lookback eye diagram channel simulation setup with chip, package, and PCB. A transmit (TX) SerDes differential signal is sent from a chip on the right. It comes out from the package and then loops back through a PCB. The signal then enters the package and eventually reaches the chip's receiver (RX). This simulation allows people to evaluate the quality of the channel by observing the received eye diagram. The simulation frequency is 25 Gb/s. A simple IBIS-AMI model is used for comparison. The PCB length is 20 mm. Its differential impedance is 100 ohms. Its dielectric constant is 4 and the dissipation factor is 0.02.

Figure 30:
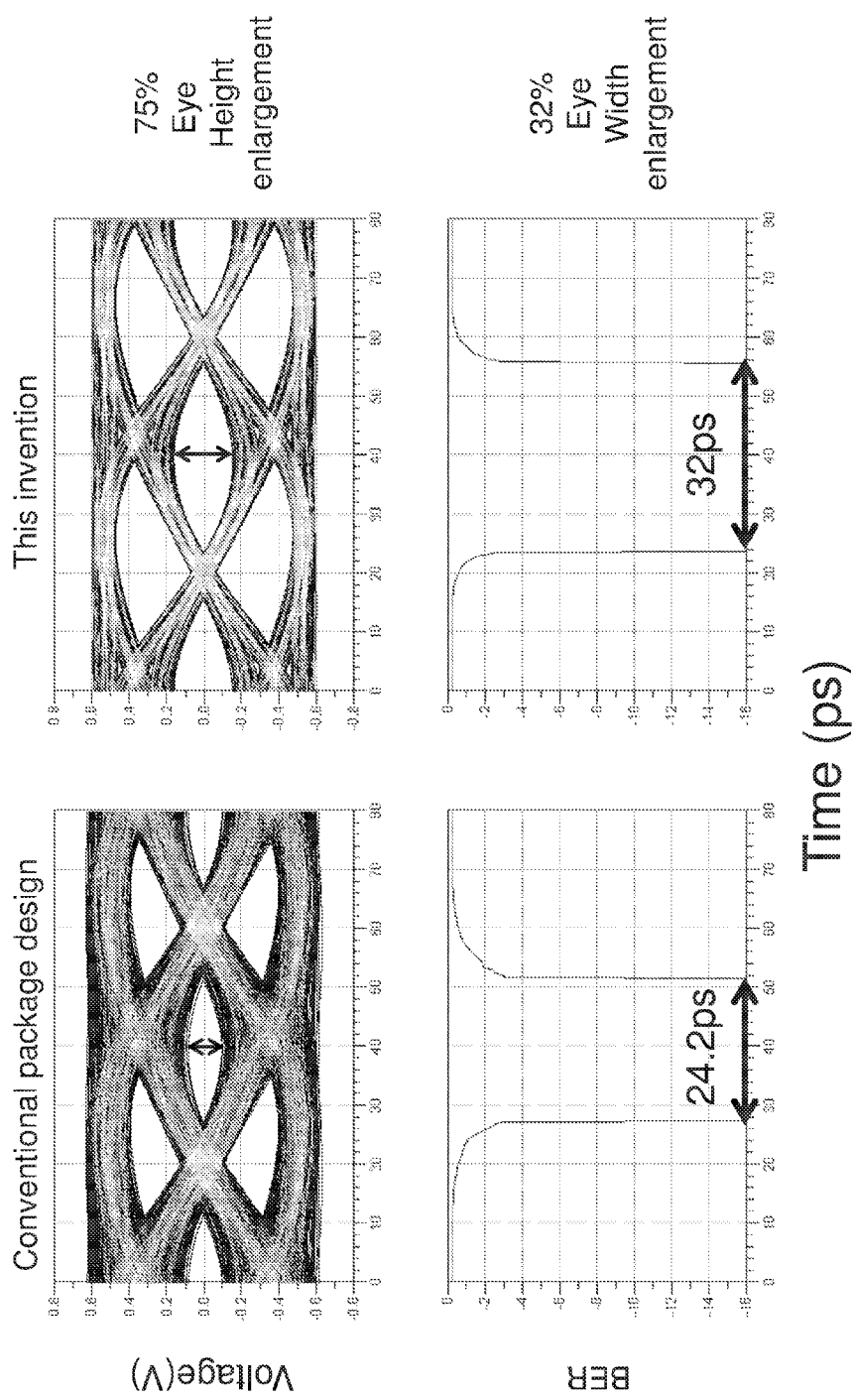
FIG. 30 demonstrates the receiver eye quality improvement of the third embodiment compared to the conventional package design for the channel described in FIG. 29.

FIG. 30 shows the SerDes eye diagram simulation result and the BER (Bit Error Rate) bathtub curve in a channel loopback simulation environment as shown in FIG. 29. The eye height was enlarged from 0.179V to 0.314V. This is a 75% enlargement in eye height. The eye width was widened from 24.2 ps to 32 ps. This is a 32% enlargement in eye width. It should be noted that real eye diagram improvement depends on the actual IBIS-AMI model used. The absolute voltage and picosecond numbers shown in the graphs do not mean too much because of our employment of a simple *IBIS*-AMI model as well as a hypothetical PCB. But the relative enlargement in percentage for eye height and eye width demonstrates the effective of this embodiment.

FIG. 31 lists some key package design parameters for the example design. At least these values could be used as good initial values in real package design optimization.

Fourth Embodiment

In the first to third embodiments, all the SerDes vias from above a PTH (Plated-Through-Hole) to the trace routing layer are stacked up and centered around the PTH; additionally, all the SerDes vias from below the PTH to the bottom BGA landing pad layer are stacked up as well and they are either centered around the PTH or outside the PTH. As today's high performance ASIC chips require more and more substrate layers, stacking 5 or more vias becomes necessary. Unfortunately, not all package substrate vendors can support this in their standard substrate fabrication process. Some vendors only allow a maximum of 4 stacked vias. Even for companies that accept 5 stacked vias, the mechanical stress introduced by these stacked vias will be a concern. It is preferable that some form of stress reduction can be achieved.

Traditionally, SerDes signals are routed closer to the top package substrate layers. For microstrip line, they are routed on the top surface metal layer. For stripline, they are usually routed on the second metal layer right below the top surface metal layer. But, in today's high performance ASIC chips, many SerDes signals are required. As a result, SerDes signals may be routed deep inside the package substrate layers. For a 12 layer package, they may be routed on layer 5, because all other layers are either used for ground or reserved for other SerDes signals.

The fourth embodiment addresses the issues mentioned above. It provides a practical solution to deal with these problems. Designs according to the fourth embodiment use standard package substrate design rules. The designed substrate can be manufactured with standard substrate fabrication process. On the other hand, electrical performances in differential insertion loss, differential return loss, and differential impedance continuity will not be compromised.

As an example to explain the embodiment, a 12-layer package substrate is described. The table in FIG. 32 shows the package layer stackup. It lists each layer's thickness and the electrical properties for each layer. To enhance model accuracy, conductor surface roughness and frequency-dependent dielectric constant and loss tangent could be used. To better illustrate this embodiment, the description is broken down into two areas, C4 bump area and BGA ball area. In between standard differential trace routing is utilized to make the connection.

In the C4 bump area vias are dropped under the two SerDes signal bumps all the way down to the trace routing layer. These vias are vertically stacked underneath the C4 bumps. Around the two SerDes bumps and vias, unwelcomed ground metals or vias should be cut or removed for better electrical performance. Some people believe these ground metals and vias help provide a better shielding to the SerDes signals and therefore enhance the SerDes differential signals' electrical performance. A 3D EM simulation with rigorous HFSS tool done by the inventors suggests the other way around. FIGS. 33a and 33b are a comparison between this embodiment (FIG. 33a) and a traditional routing (FIG. 33b) around two SerDes bumps on the top metal layer. It can be seen that in this embodiment a VSS ground trace in between the two SerDes signals is removed; a VSS ground trace width is narrowed; and many ground metals around the two SerDes bumps are trimmed. All these features are aimed at removing the unwelcomed excessive ground metals surrounding the two SerDes bumps and therefore avoiding too much capacitive coupling between the two SerDes signals and the ground which tends to degrade the electrical performance of insertion loss and return loss.

Figures 34A, 34B:
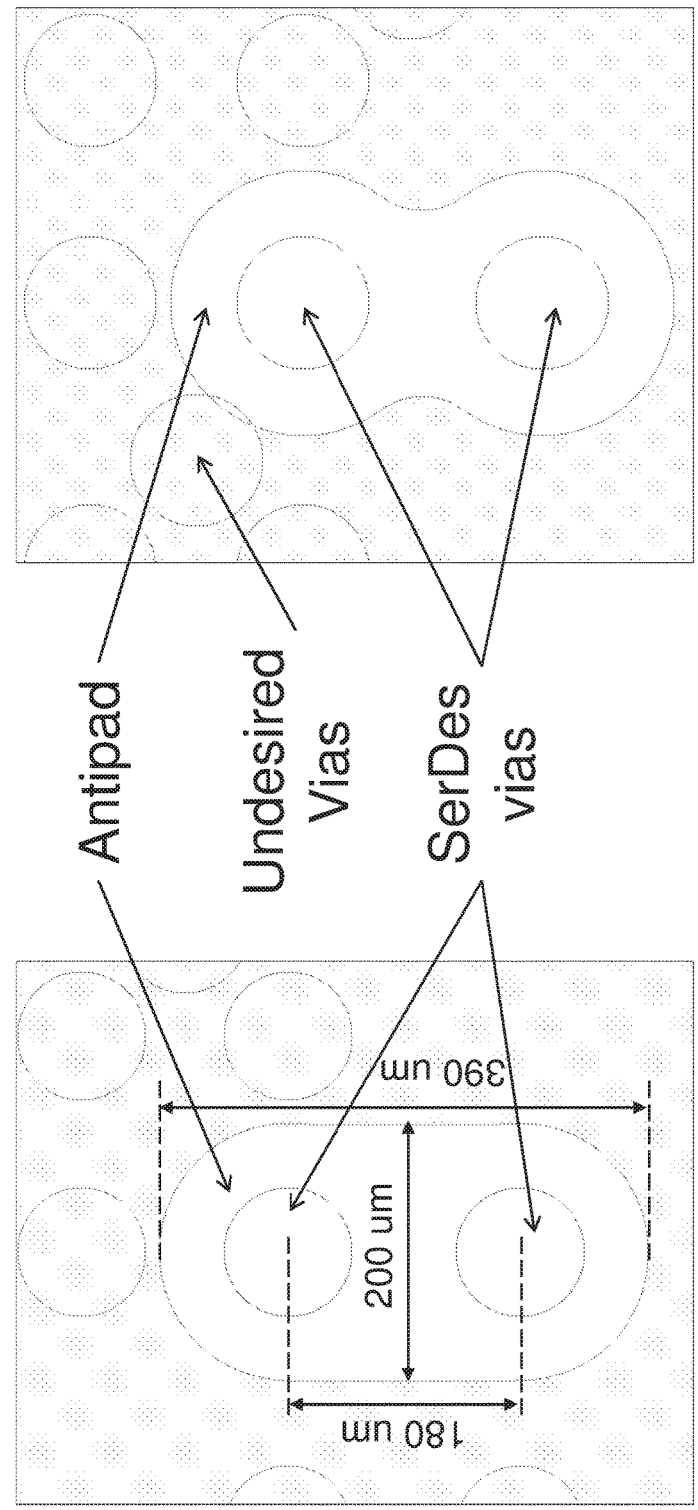
FIG. 34a shows the design for metal layer 2, 3, and 4 of the fourth embodiment. A traditional design is shown in FIG. 34b.

FIG. 34a shows the design of the fourth embodiment from the second metal layer down to the layer right above the routing layer. All vias below the C4 bumps are stacked. A large antipad to cut out undesired ground metals is constructed for all the metal layers from the second metal layer all the way down to the layer right above the routing layer. Exemplary dimension of the antipad is labeled on the graph. Its opening size should not be too small, otherwise the two SerDes signal vias' differential impedance will be lowered. Also, the opening size should not be too large, otherwise it will increase the trace impedance because above the SerDes trace no ground plane will be served. Also, undesired ground vias, if too close to the two SerDes signals, should be removed. FIG. 34b is a conventional design as a comparison. Its antipad has some ground metals that need to be trimmed. It has a ground via too close to the SerDes signals which should be removed. The size of the antipad may be optimized.

Figure 35B:
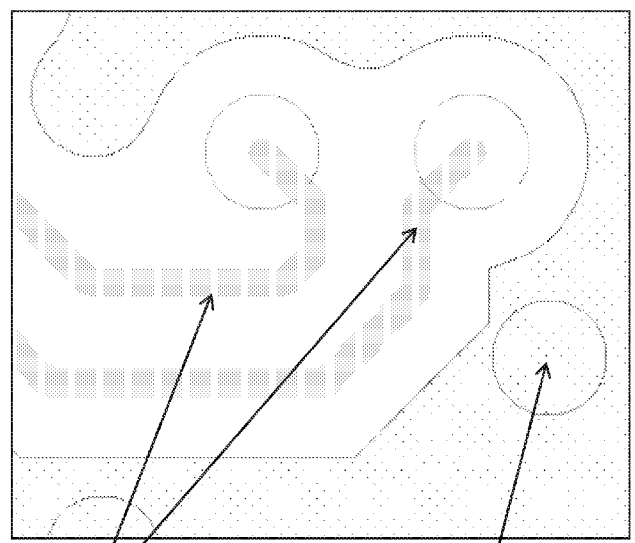
FIG. 35a illustrates the SerDes trace routing under their C4 bump area of the fourth embodiment. Straight routing is preferred as compared to conventional wiggled routing depicted in FIG. 35b.
Figure 35A:
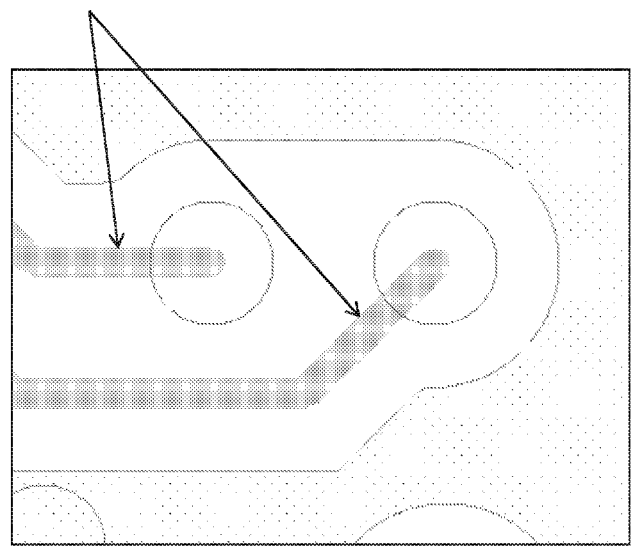

FIG. 35a shows the initial routing from the C4 bump dropped via to the BGA ball direction in the fourth embodiment. This is layer 5 in the C4 bump region. In this area there are no ground planes for good stripline structure because of the existence of antipad. It is preferred to do straight fan out as pictured in FIG. 35a. Traditionally people tend to use this area for trace length matching by having wiggled differential trace routing as shown in FIG. 35b. This kind of curved routing degrades the electrical performance.

Figure 36B:
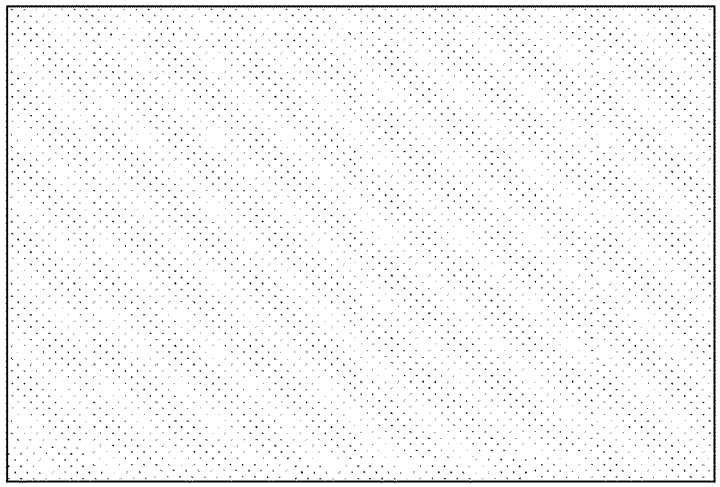
FIG. 36b shows a Traditional design where no antipad is present.
Figure 36A:
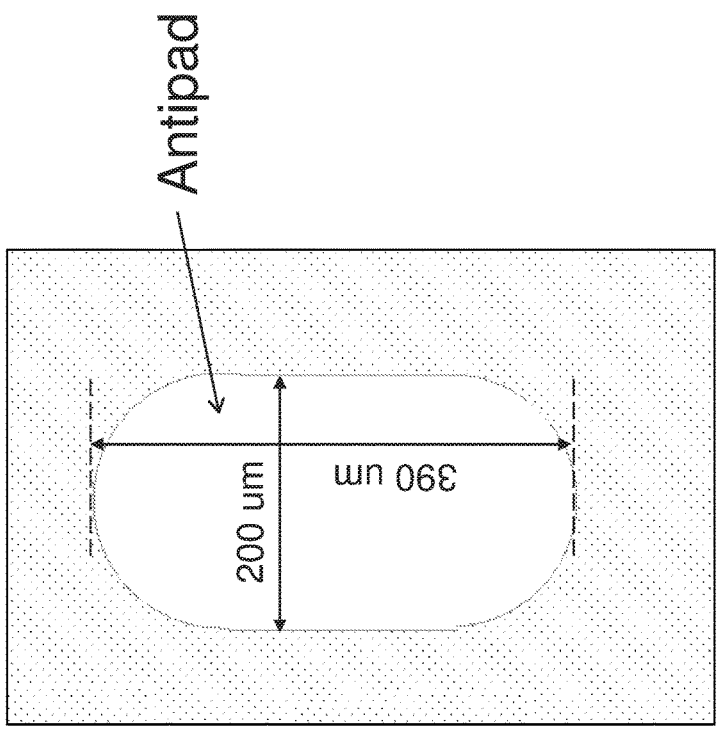
FIG. 36a shows antipad is still required right below the routing layer and under the SerDes vias in copper layer 6 in the C4 bump region in the fourth embodiment.

FIG. 36a is for copper layer 6 in the C4 bump region. Below the trace routing layer and right underneath the SerDes bump/via area there is an antipad. Its size is as large as the antipad drawn in FIG. 34a above the trace routing layer. This is shown as FIG. 36a. This is to reduce excessive capacitive coupling which tends to dramatically lower the differential impedance. Traditionally no antipad was used as shown in FIG. 36b.

Figure 37:
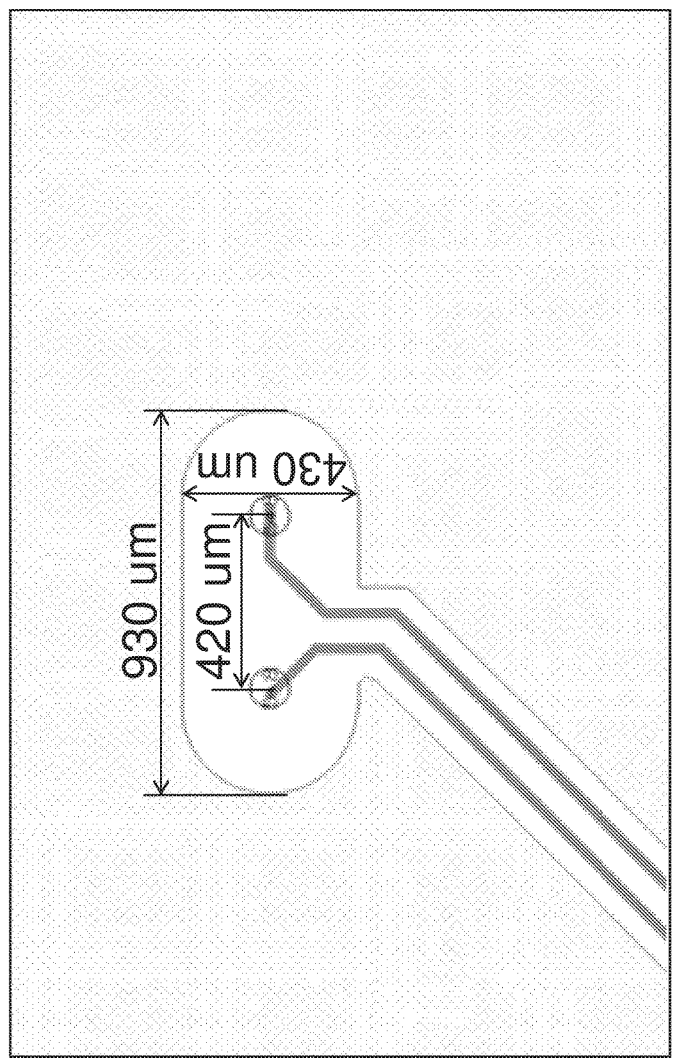
FIG. 37 represents the SerDes trace routing near the BGA ball region in the fourth embodiment.

FIG. 37 is the routing layer picture near the BGA ball region in the fourth embodiment. This is for copper layer 5 in the BGA ball region. Void is still necessary to reduce capacitive coupling. Above this layer there is no antipad. On this routing layer the metal void (similar to antipad) shape and size have been optimized for best differential insertion loss, differential return loss, and differential impedance continuity. Same is true for the separation of the two SerDes vias. Exemplary optimized dimensions are labeled on the graph.

Figure 38:
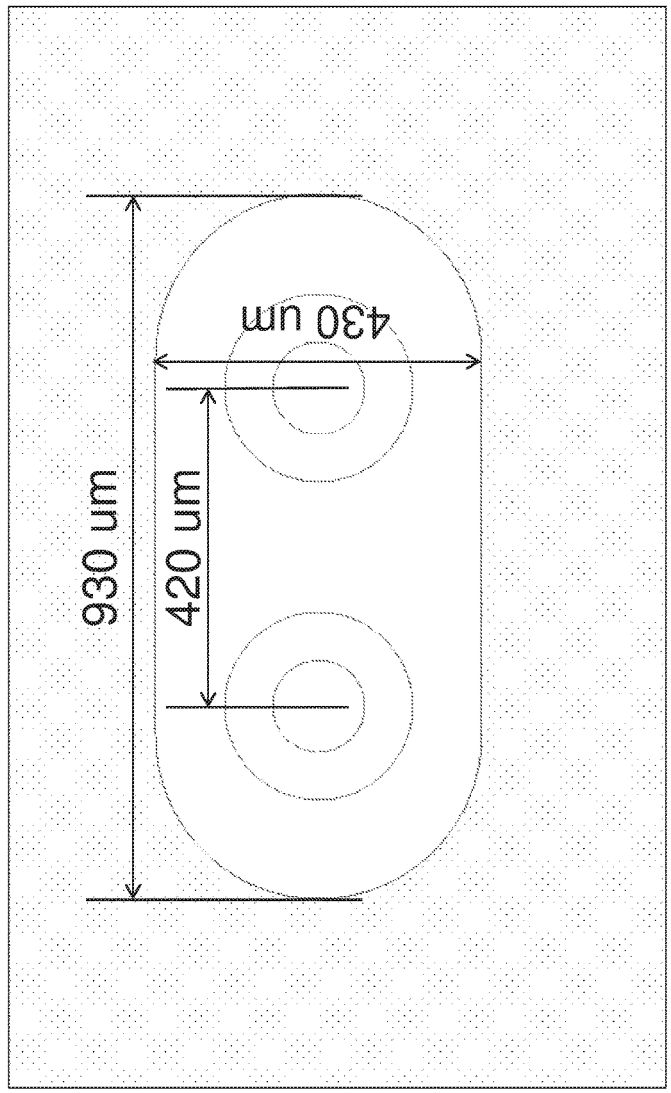
FIG. 38 provides a picture of the core metal layer design on top of the core dielectric layer.

FIG. 38 shows the next layer below the routing layer in the BGA ball region in the fourth embodiment. It is also the top core metal layer with 2 PTHs (Plated-Through Hole). The PTH's pitch is optimized at 420 um with the antipad size of 430 um by 930 um. This is for copper layer 6 in the BGA ball region. The separation of the two PTHs and the size and shape of the antipad are the same as in FIG. 37.

Figure 39:
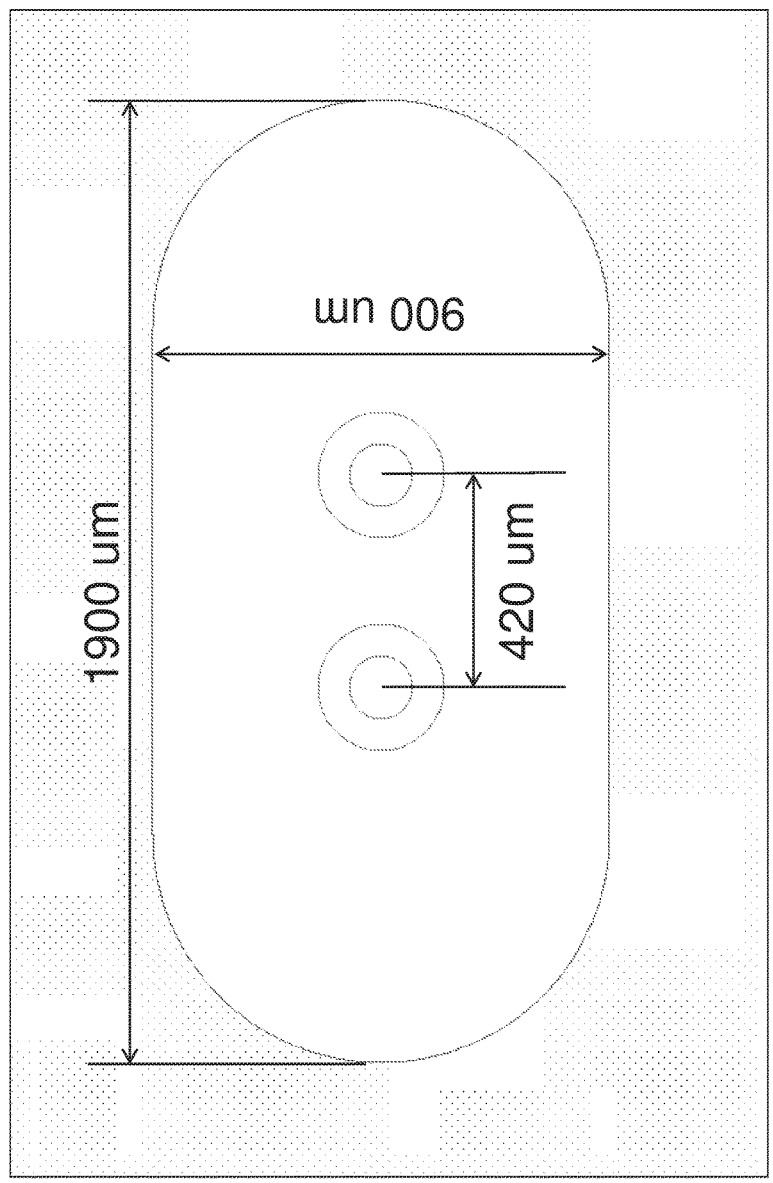
FIG. 39 shows the core metal layer design on the bottom of the core dielectric layer.

For the backside of the core layer, shown in FIG. 39, the antipad is much larger than that in the front side. This layer is copper layer 7 in the BGA ball region. Exemplary dimensions are shown in FIG. 39. Here a larger antipad is utilized to lower the capacitive coupling with the large BGA landing pad. The reason that the antipad is much larger at the back side of the substrate below the core is because of the need to reduce the capacitive coupling between the ground metals above the BGA ball landing pad and the BGA ball landing pad. These large capacitive couplings create high impedance discontinuities and, as a result, generate worse return loss.

Figure 40:
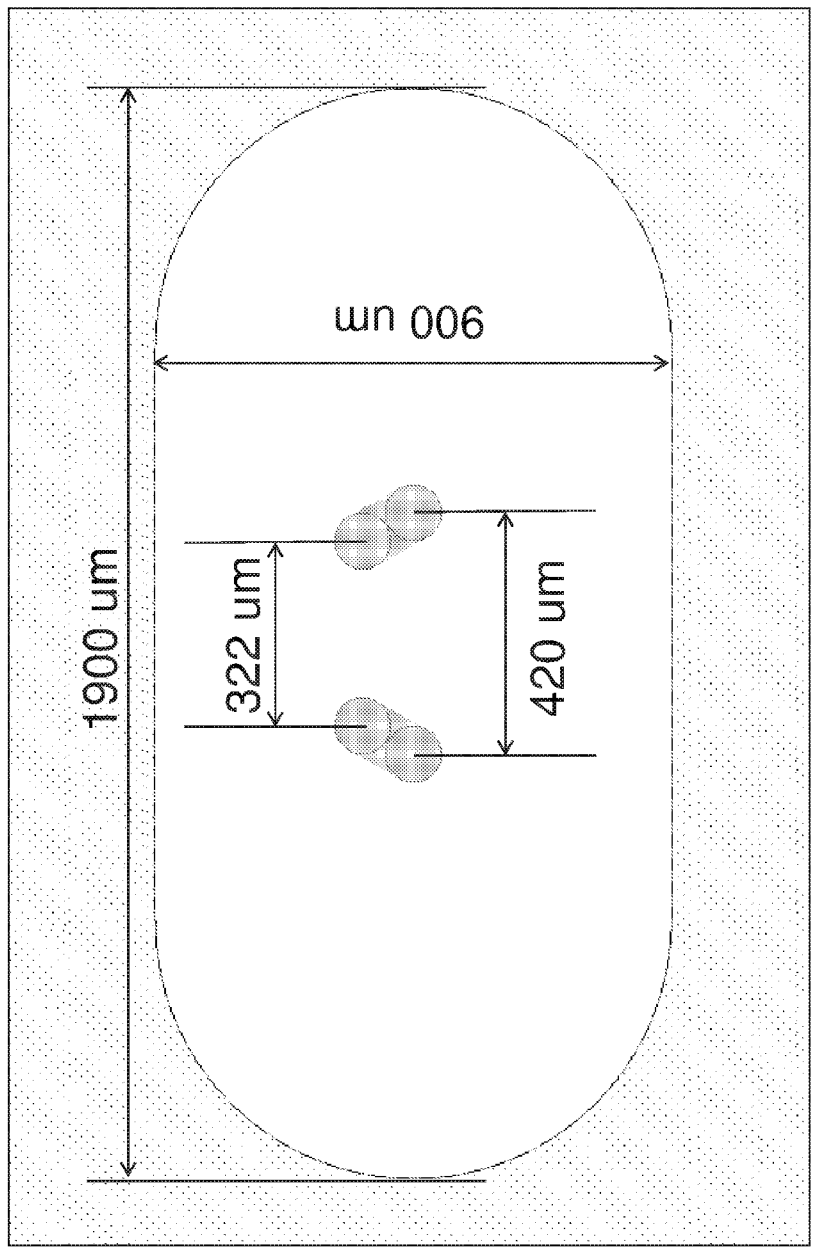
FIG. 40 shows the via pitch transition from PTH's 420 um to an optimized 322 um on copper layer 8.

In layer 7 below the two PTHs, there are two vias directly below the centers of the two PTHs, respectively. The pitch of these vias is 420 um. Then starting from the next layer down, i.e. layers 8-12, the vias for each SerDes signal are stacked on top of each other, and the antipads carry the same size and shape and are also aligned on top of each other. Again, large antipads are used. The pitch of the via stack in layers 8-12 is reduced to 322 um for optimal electrical performance. In copper layer 8, a short trace connects the via in layer 7 and the corresponding via in layer 8 for each SerDes differential signal, as shown in FIG. 40. FIG. 40 shows the via pitch transition from PTH's 420 um to an optimized 322 um on copper layer 8. In the example shown in FIG. 40, the two connected vias (in layer 7 and layer 8, respectively) are touching each other in the top view, to minimize horizontal routing on copper layer 8 which tends to degrade electrical performance. The center to center distance for the two SerDes signals' via stack going down to the BGA is optimized at 322 um. This arrangement avoids all backside vias stacked on top of each other and centered to the PTHs. It helps to reduce mechanical stress and allows all major substrate vendors to fabricate the package substrate in high volume production without using non-standard process. On the other hand, it will be shown later on that electrical performance for insertion loss and return loss won't be compromised. It should be noted that the via pitch transition layer may alternatively be on the second metal layer below the bottom of the core layer, i.e. copper layer 9 if 14 package substrate layers are desired. It may also be on the third or fourth metal layer below if 16 or 18 package substrate layers are designed.

Figure 41:
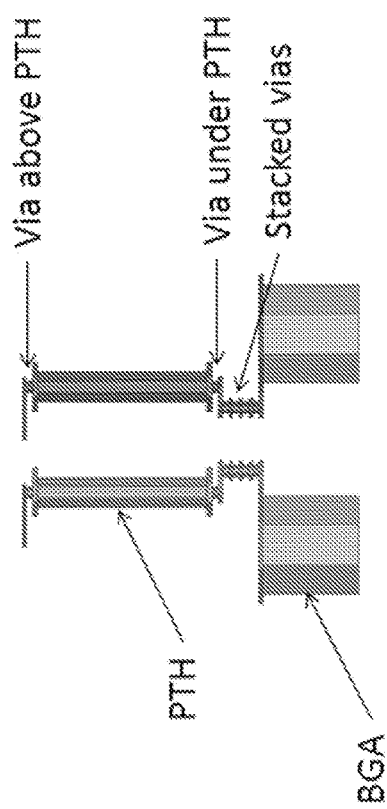
FIG. 41 shows a side view of the via and via stack structures below the PTH.

FIG. 41 shows a side view of the above-described via and via stack structures below the PTH. Note that the pitches of the vias and via stacks are not to scale (for example, the via in the layer just below the PTH and the via stack in the lower layers are farther apart than that shown in FIG. 40).

Figure 42:
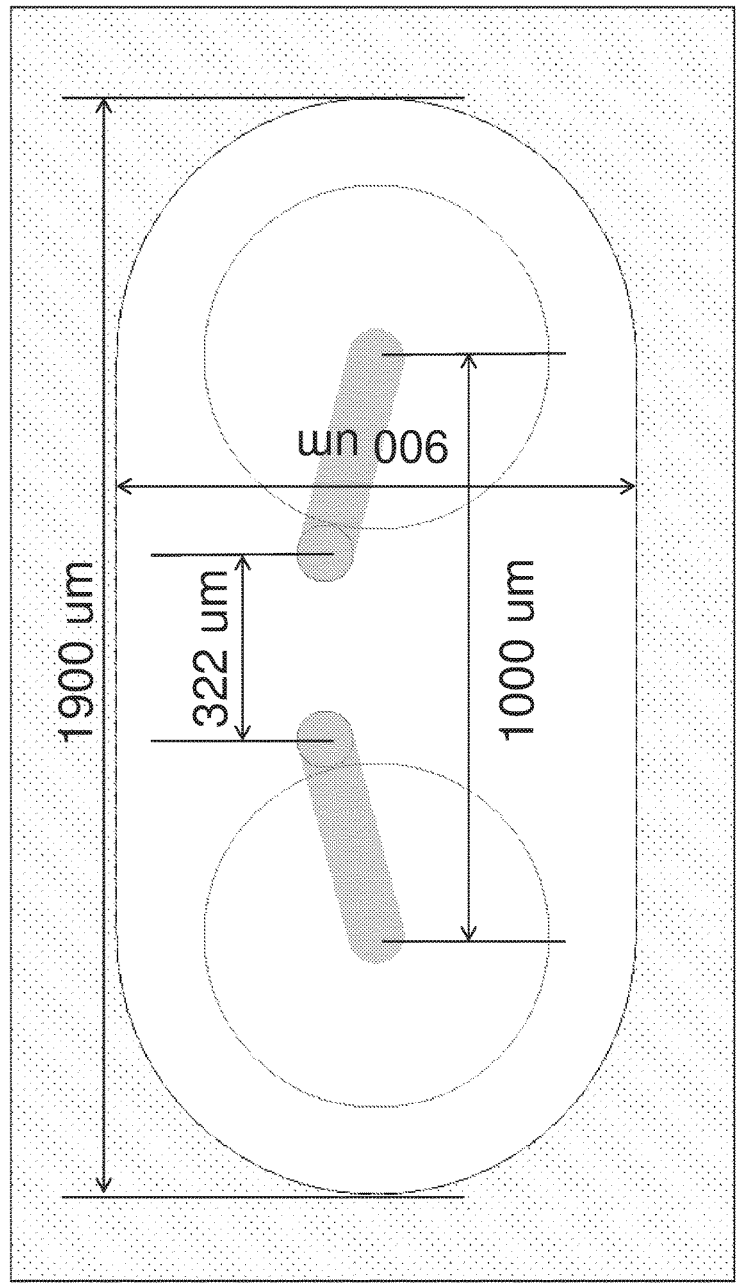
FIG. 42 shows the bottom metal layer design that has the vias connected to the BGA ball landing pad.

A trace on the bottom metal layer connects the bottom via to the BGA ball landing pad. Now the SerDes differential signal spacing has been increased from 322 um to 1 mm to accommodate the 1 mm BGA ball pitch. The metal layer routing is shown in FIG. 42. Exemplary dimensions are drawn on the plot. In this design, the vias are outside the BGA ball landing pad. It offers the flexibility for the designer to adjust the SerDes via pitch to the optimal separation distance. In the meantime, it won't create mechanical stress to the substrate. Based on substrate design rule, having a via inside the BGA ball landing pad is not allowed unless it sits at the center of the BGA ball landing pad. Once at the center the SerDes via pitch will have to follow the BGA ball pitch which is 1 mm in this case. Since this will not provide the best impedance continuity, placing the vias inside the BGA landing pad should be avoid. Also, the via and the BGA ball landing pad is touching each other to minimize horizontal routing which tends to degrade electrical performance.

Figure 43:
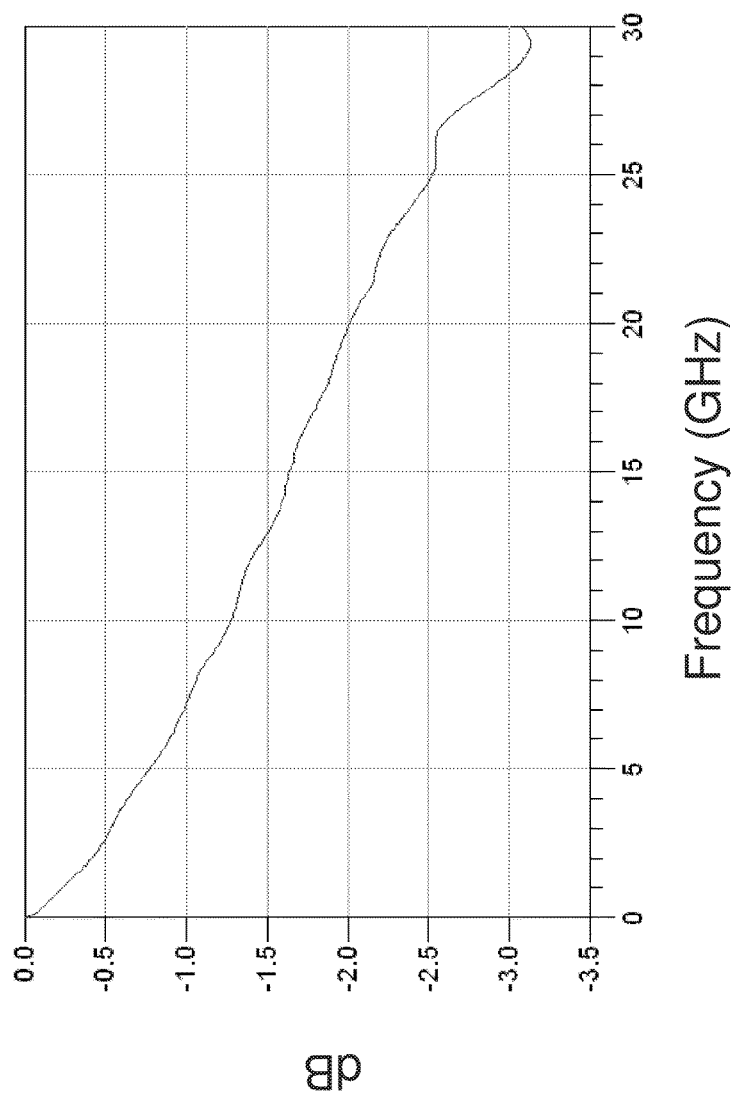
FIG. 43 is the simulated differential insertion loss with 3D electrical modeling tool HFSS of the fourth embodiment.

FIG. 43 shows the differential insertion loss of the fourth embodiment. It can be seen that the curve approximates a straight line quite well with minimal oscillation. This is desired by SerDes IP developers because it allows them to do accurate frequency compensation.

Figure 44:
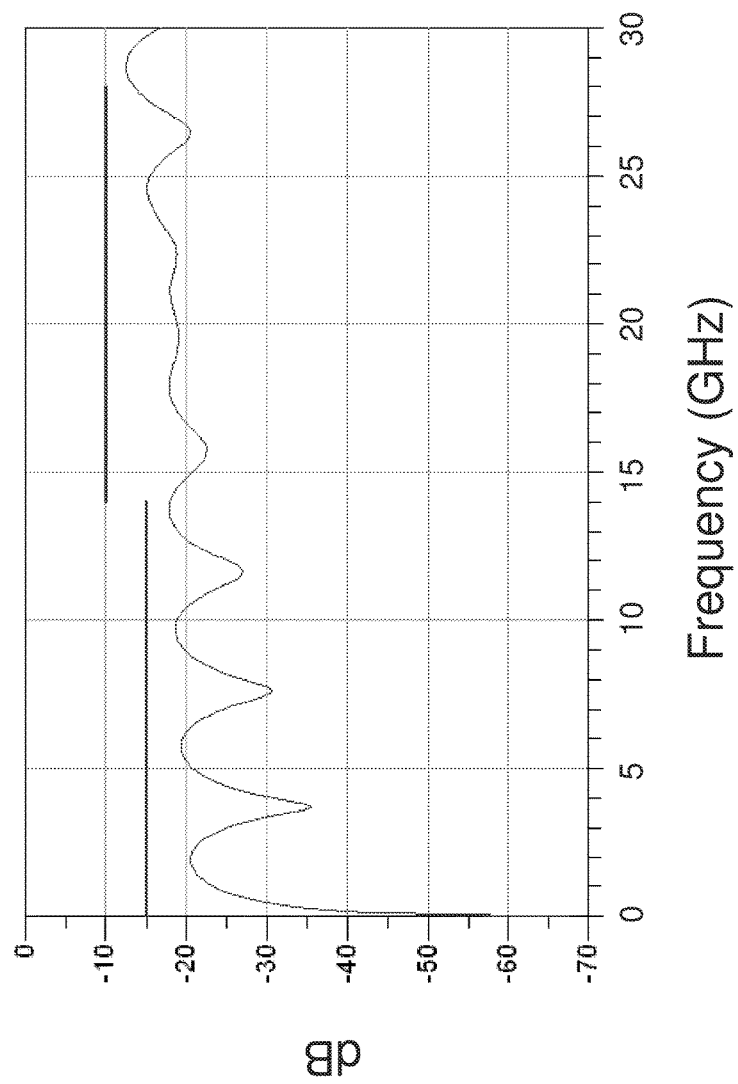
FIG. 44 and FIG. 45 show the simulated differential return loss plots at C4 bump side and at BGA ball side respectively.
Figure 45:
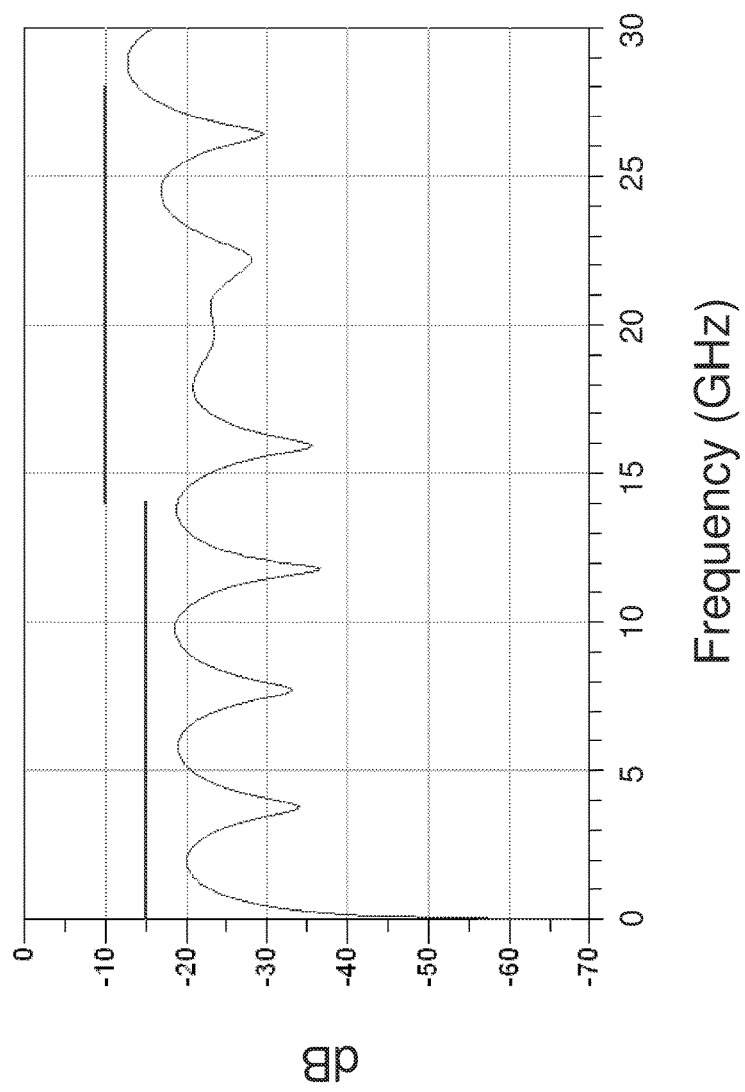

FIGS. 44 and 45 show the differential return loss at C4 bump side and at BGA ball side respectively. On either side, the plot shows a low differential return loss. This means the design is suitable for either transmission or reception of SerDes signals. Below 28 GHz, the package has a differential return loss below −15 dB. Even at 30 GHz, it is still lower than −10 dB. The two solid lines are specifications of differential return loss proposed by some companies as a requirement for their 56 Gb/s SerDes. From the plots it can be seen that the differential return loss is usually more than 3 dB lower than the spec in the entire frequency spectrum. This provides a safe margin when manufacturing tolerance is considered.

The optimization procedure described above and summarized in FIG. 13 applies to the third and fourth embodiments as well. Stated more generally, the optimization procedure can be used in packages where the trace routing layer is located either in the second metal layer (as in the examples of the first and second embodiments), or in a deeper metal layer (as in the example of the fourth embodiment), or in packages without any inside routing layer where microstrip lines are used to route signals in the top metal layer (as in the example of the third embodiment). The optimization procedure can also be used in packages with two or more routing layers, e.g. two or more inside routing layers, or microstrip lines in the top metal layer and one or more inside routing layers, etc., with the vias being stacked between adjacent routing layers.

As summarized above, the various embodiments of the present invention provide vertical interconnection structures that employ BGA/via/PTH in an organic package substrate, where, by controlling various parameters, the SerDes differential impedance can be optimized for signals of 25 Gb/s and beyond. In one aspect, the invention is directed to vertical interconnection structures that have certain structural features, which permit controlling of their parameters for SerDes differential impedance optimization. In another aspect, the invention is directed an optimization method that optimizes SerDes differential impedance by controlling various structural parameters of the vertical interconnection structures.

It will be apparent to those skilled in the art that various modification and variations can be made in the chip package design and design method of the present invention without departing from the spirit or scope of the invention. Thus, it is intended that the present invention cover modifications and variations that come within the scope of the appended claims and their equivalents.

What is claimed is:

1. A semiconductor chip package comprising:
   a plurality of dielectric layers and a plurality of conductive layers interleaved with each other forming a stack of layers;
   wherein at least one of the conductive layers is a routing layer having first and second metal traces connected respectively to first and second vias;
   the first and second vias are connected to first and second plated-through-holes (PTHs) adjacent each other and which extend through the dielectric layers to connect to third and fourth vias; and
   a first and second ball grid array (BGA) pads forming a first plane coupled to the third and fourth vias, wherein the first and second BGA pads are rotated at a first angle greater than zero to a second plane formed by the first and second PTHs.

2. The package of claim 1 wherein the first angle is ninety degrees.

3. The package of claim 1, wherein the first and second metal traces each including a designated initial segment having a predetermined length and a predetermined width which are different from a width of remaining portions of the first and second metal traces.

4. The package of claim 1 wherein the at least one of the conductive layers has a metal ground plane with an antipad around first and second via landing pads corresponding to the first and second via stacks, and wherein each of the second subset of conductive layers is free of a metal ground plane.

5. The package of claim 1 further comprising:
   at least a first and a second silicon die bumps (C4 bumps) formed on a top one of the plurality of conductive layers, wherein each C4 bump is electrically connected to the first and second metal layers;
   wherein the first and second C4 bumps are electrically coupled through the first and second vias, first and second PTHs and third and fourth vias to the first and second BGA pads; and
   wherein a SerDes signal differential impedance from the first and second BGA balls to the corresponding first and second C4 bumps has a variation of less than 10% in a time domain for a signal with a 25 Gb/s or higher data rate.

6. The package of claim 1, wherein the first BGA pad is connected to the third via by a first interconnect having a width smaller than the diameter of the first BGA pad and the second BGA pad is connected to the fourth via by a second interconnect having a width smaller than the diameter of the second BGA pad.

7. A semiconductor chip package comprising:
   a plurality of dielectric layers and a plurality of conductive layers interleaved with each other forming a stack of layers;
   wherein at least one of the conductive layers is a routing layer having first and second metal traces connected respectively to first and second vias, wherein the first and second metal traces each including a designated initial segment having a predetermined length and a predetermined width which are different from a width of remaining portions of the first and second metal traces;
   the first and second vias are connected to first and second plated-through-holes (PTHs) adjacent each other and which extend through the dielectric layers to connect to third and fourth vias;
   a first and second ball grid array (BGA) pads forming a first plane coupled to the third and fourth vias, wherein the first and second BGA pads are rotated at a first angle greater than zero to a second plane formed by the first and second PTHs;
   at least a first and a second silicon die bumps (C4 bumps) formed on a top one of the plurality of conductive layers, wherein each C4 bump is electrically connected to the first and second metal layers;
   wherein the first and second C4 bumps are electrically coupled through the first and second vias, first and second PTHs and third and fourth vias to the first and second BGA pads; and
   wherein a SerDes signal differential impedance from the first and second BGA balls to the corresponding first and second C4 bumps has a variation of less than 10% in a time domain for a signal with a 25 Gb/s or higher data rate.

8. The package of claim 1 wherein the first angle is ninety degrees.

9. The package of claim 1, wherein the first BGA pad is connected to the third via by a first interconnect having a width smaller than the diameter of the first BGA pad and the second BGA pad is connected to the fourth via by a second interconnect having a width smaller than the diameter of the second BGA pad.

10. An optimization method for a semiconductor chip package for high speed SerDes signals comprising:
    conducting signals with a 25 Gb/s or higher data rate on a routing layer of a plurality of conductive layers which are interleaved with a plurality of dielectric layers to form a stack of layers, wherein the routing layer has first and second metal traces which are connected to first and second vias;
    wherein the conducted signals travel through the first and second vias to first and second plated-through-holes (PTHs) adjacent each other and separated by a first distance which extend through the dielectric layers to connect to third and fourth vias; and wherein the conducted signals are transmitted through the third and fourth vias to a first and second ball grid array (BGA) pads forming a first plane and wherein the first and second BGA pads are rotated at a first angle greater than zero to a second plane formed by the first and second PTHs.

11. The method of claim 10 wherein the first angle is ninety degrees.

* * * * *